US011351641B2

(12) United States Patent
Sheldon et al.

(10) Patent No.: US 11,351,641 B2
(45) Date of Patent: Jun. 7, 2022

(54) TEMPLATE GUIDANCE SYSTEM FOR A ROUTER

(71) Applicant: Woodcraft Solutions LLC, Oregon City, OR (US)

(72) Inventors: Dwight Sheldon, Oregon City, OR (US); Kuldeep Singh, Kyoto (JP)

(73) Assignee: Woodcraft Solutions LLC, Oregon City, OR (US)

( * ) Notice: Subject to any disclaimer, the term of this patent is extended or adjusted under 35 U.S.C. 154(b) by 252 days.

(21) Appl. No.: 16/729,300

(22) Filed: Dec. 28, 2019

(65) Prior Publication Data

US 2020/0130119 A1    Apr. 30, 2020

Related U.S. Application Data

(63) Continuation-in-part of application No. 15/650,794, filed on Jul. 14, 2017, now Pat. No. 10,639,754.

(51) Int. Cl.
*B27F 5/02* (2006.01)
*B23Q 3/00* (2006.01)
*B27C 5/10* (2006.01)

(52) U.S. Cl.
CPC .............. *B23Q 3/007* (2013.01); *B23Q 3/002* (2013.01); *B27F 5/02* (2013.01); *B23Q 2735/004* (2013.01); *B27C 5/10* (2013.01)

(58) Field of Classification Search
CPC ...... B27F 1/00; B27F 1/02; B27F 1/04; B27F 1/08; B27F 1/10; B27F 1/12; B27F 1/14; B27F 1/16; B27F 5/00; B27F 5/02; B27F 5/12; B27C 5/00; B27C 5/003; B23Q 33/00; B23Q 35/00; B23Q 35/005; B23Q 35/02; B23Q 35/04; B23Q 35/08; B23Q 35/10; B23Q 35/42; B23Q 35/44; B23Q 35/46

See application file for complete search history.

(56) References Cited

U.S. PATENT DOCUMENTS

| 4,561,478 A | 12/1985 | Fields |
| 4,733,997 A | 3/1988 | Ford et al. |
| 5,494,089 A | 2/1996 | Lubbe |

(Continued)

OTHER PUBLICATIONS

Matthias Wandel, How to assemble the metal pantorouter, Oct. 13, 2015, https://www.youtube.com/watch?v=vy7STrsqzU4&t (Year: 2015).*

(Continued)

*Primary Examiner* — Matthew Katcoff
(74) *Attorney, Agent, or Firm* — Howard Russell

(57) ABSTRACT

Tapered, stepped, or non-tapered router guide templates, optionally combined template holder system, and optional tapered or non-tapered guide bearing on a readily-locatable and lockable shaft, each template comprising: a base portion, a top portion, at least one of an exterior surface interconnecting the base portion and the top portion along an outer periphery of the template and an interior surface interconnecting the base portion and the top portion along an inner periphery of the template, wherein optionally one of the exterior surface and the interior surface may be continuously tapered between the base portion and the top portion, or stepped, and wherein the base portion is adapted for removable and adjustable interconnection with the template holder system.

15 Claims, 15 Drawing Sheets

(56) References Cited

U.S. PATENT DOCUMENTS

| | | | |
|---|---|---|---|
| 6,736,173 | B1 | 5/2004 | Grisley et al. |
| 6,845,699 | B1 | 1/2005 | Anton |
| 2004/0022595 | A1 | 2/2004 | Owen |
| 2005/0236069 | A1 | 10/2005 | O'Brien |
| 2006/0021676 | A1 | 2/2006 | McDaniel et al. |
| 2009/0290949 | A1 | 11/2009 | Steger |

OTHER PUBLICATIONS

Matthias Wandel, How the pantorouter works, posted at youtube.com, published Dec. 12, 2010, © Standard YouTube License, [online], [site visited Aug. 1, 2017], 67 pages, available from Internet, <URL:https://www.youtube.com/watch?v=8wZ1v4PIsYI>.

Matthias Wandel, The Pantorouter, posted at woodgears.ca, [online], [site visited Aug. 2, 2017], 5 pages, available from Internet, <URL:https://woodgears.ca/pantorouter/>.

Humwer, Templates, posted at humwer.com, © humwer Inh. Werner Hummel—2015, [online], [site visited Aug. 2, 2017], 3 pages, available from Internet, <URL:http://www.humwer.com/en/Templates/>.

Dwight Sheldon, predecessor template with very minimal outer tapering only sold by applicant in 2015, photograph, 1 page.

Dwight Sheldon, predecessor template holder sold by applicant in 2015, photograph, 1 page.

GuidoZelf, Templates for Tenons & Mortises for Pantorouter (Woodworking router accessory), Aug. 1, 2015, 2 pages, https://www.thingiverse.com/thing:951634 (Year: 2015).

Pantorouter, Butterfly Mortise and tenon joint by Hybrid Pantorouter, Sep. 4, 2016, 1 page, https://www.youtube.com/watch?v=5yGoiqCLTk8 (Year: 2016).

Pantorouter, making large mortise and tenon by hybrid pantorouter, Jun. 7, 2013, 1 page, https://www.youtube.com/watch?v=-QxgrukqFGc (Year: 2013).

\* cited by examiner

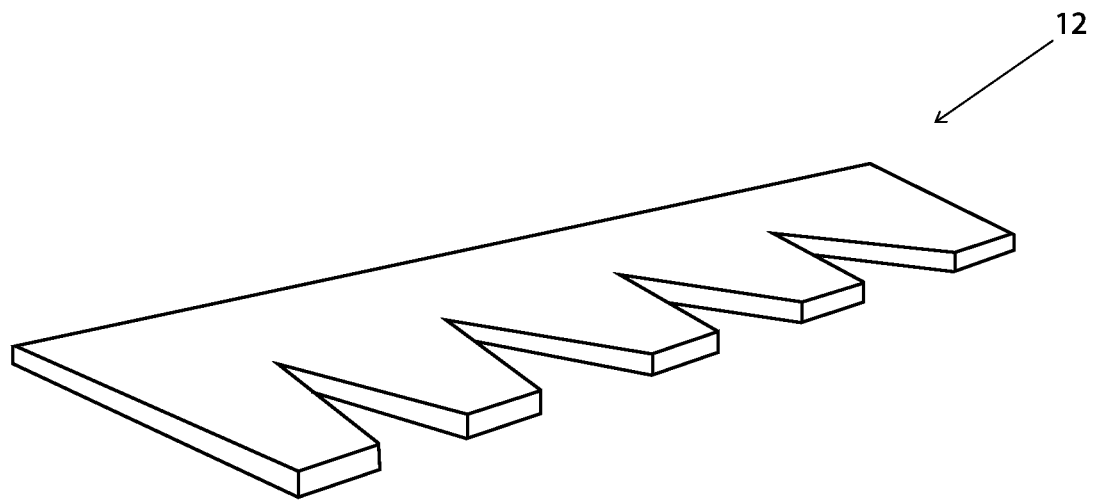
FIG. 1A — Prior Art
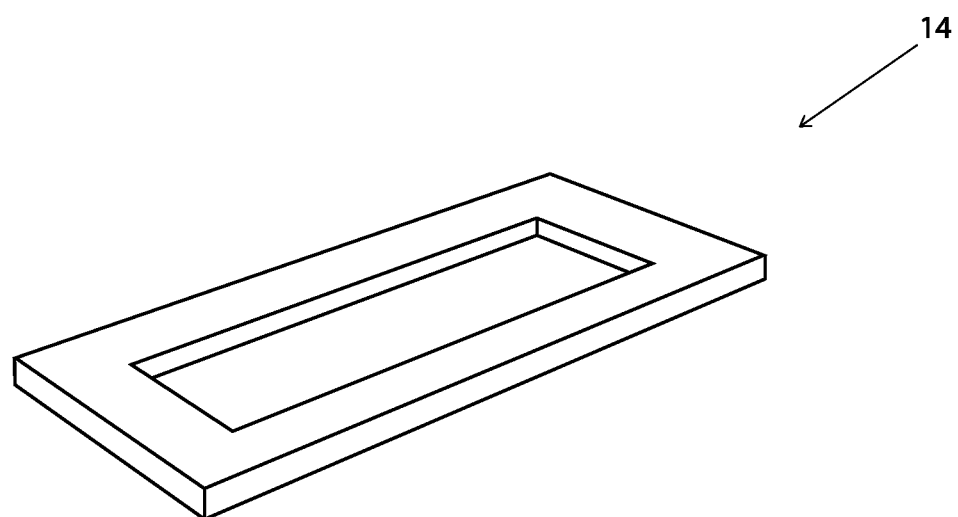
FIG. 1B — Prior Art

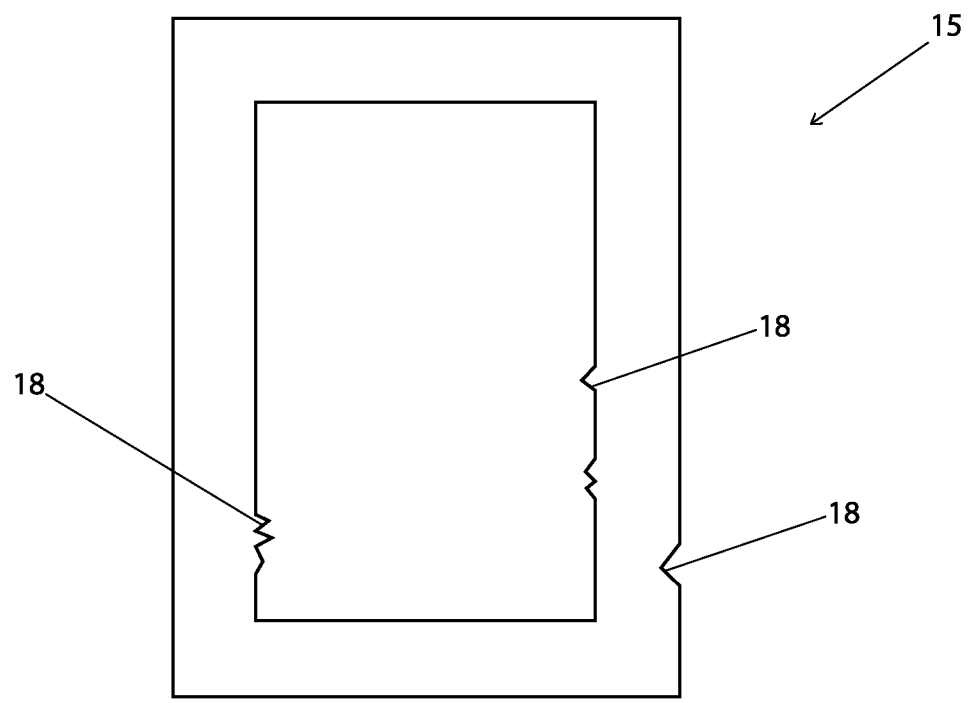
FIG. 1C — Prior Art
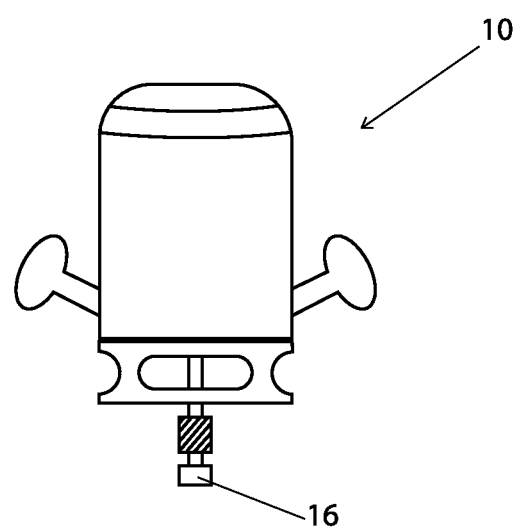
FIG. 1D — Prior Art

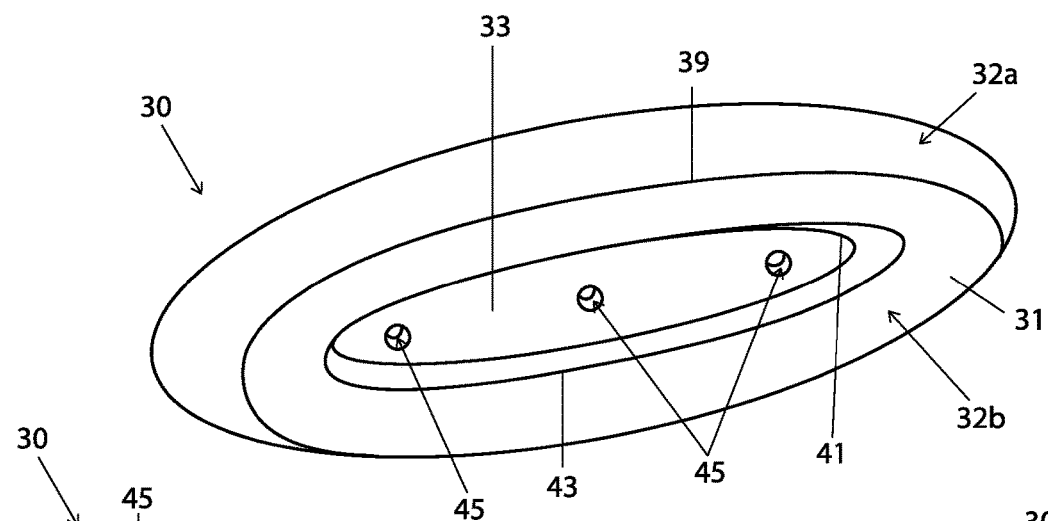
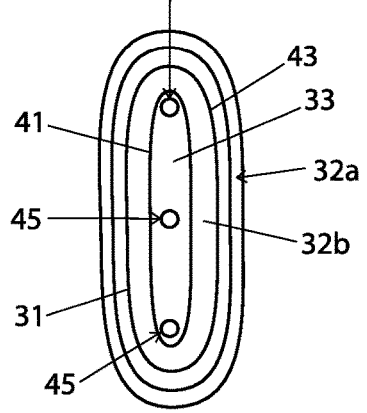
FIG. 3B
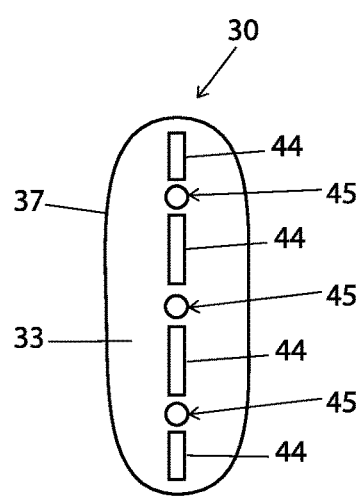
FIG. 3C
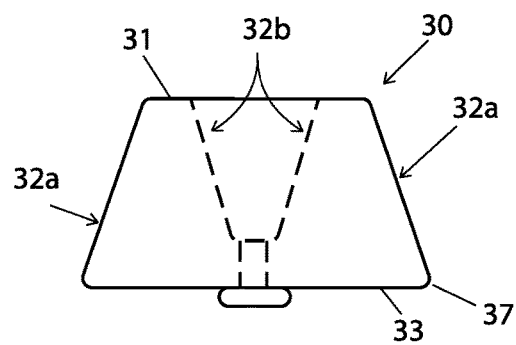
FIG. 3D
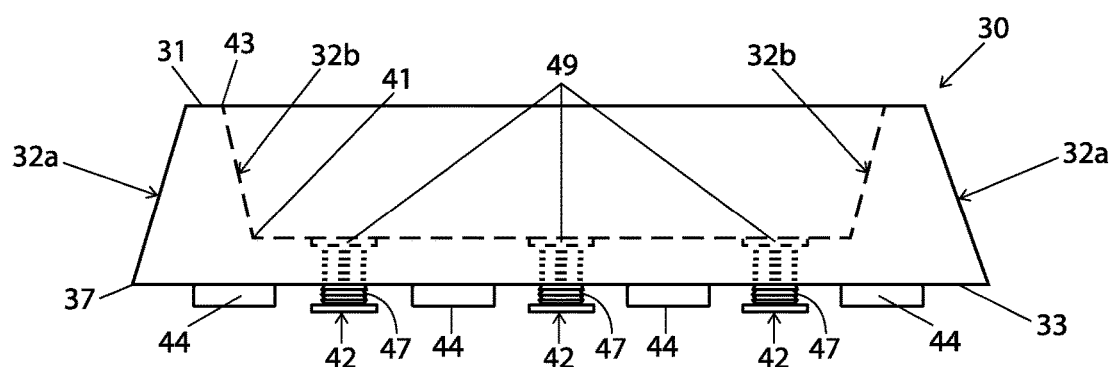
FIG. 3E

TEMPLATE GUIDANCE SYSTEM FOR A ROUTER

CROSS-REFERENCE TO RELATED APPLICATION

The present patent application is a continuation-in-part patent application filed under 35 U.S.C. § 120 and claiming the priority and benefit of U.S. patent application Ser. No. 15/650,794, filed 14 Jul. 2017.

FIELD OF INVENTION

The present invention relates to a template-guided system for routers, and more particularly to a template-guided system for pantograph-type router systems comprising a readily adjustable template holder for holding a tapered template, or readily-adjustable tapered templates, the templates being readily adjustable on the template holder, together with an improved system and method for centering templates on the template holder, to facilitate efficient and highly accurate router cuts.

BACKGROUND OF INVENTION

As shown in FIGS. 1A-D, a router 10 (as shown in FIG. 5) has been commonly used with a pattern or jig 12, 14, 15 to follow a shape or a form. Some jigs have used a bit-mounted guide bearing 16 to follow the shape, and some jigs have used the base of the router, or a collar around the bit, to follow the inside or outside of a pattern. These have all been one-to-one ratio router guide systems where the pattern 12, 14 has been the same size, or has allowed the same travel, as the desired carved or cut pattern or shape in the workpiece.

A Hybrid PantoRouter™, PantoRouter™ 49 shown in FIG. 5, and other router systems, have used a router to make cuts in wood, plastic and soft metals. The bit 52 for such a router 49 typically spins at up to ~24,000 RPM and is often difficult to precisely control using conventional, manually-operated, methods and commonly available jigs and templates. Templates and template holder systems available to date, such as those from JDS Multi-Tools or Rockler Woodworking and Hardware, have been manufactured and sold in fixed sizes and shapes and have not allowed the degree of fine adjustment provided by the present invention to compensate for slightly different router bit diameters, for example as may have been encountered from one bit manufacturer to another, to allow for desired glue space, or to compensate for different wood species. The manufacturer of the JDS Multi-Tools and Rockler Woodworking and Hardware jigs have offered different templates of slightly different sizes, but no other system has been provided by the prior art to allow simple micro-adjustment of a router like that of the present template system.

PantoRouter router systems comprise a guide bearing that is adapted to follow along a template, and the position of such a guide bearing has been adjustable to varying depths to affect the positioning of the guide bearing relative to a template used to create, for example mortise and tenon, joints for joining wood members together. This adjustment of the guide bearing of the PantoRouter system has been somewhat time-consuming and has required a moderate amount of trial and error to set the depth of the guide bearing to an appropriate depth.

A common method of alignment of a workpiece on a mount or table has been to measure the thickness of the workpiece using a scale or caliper, after which the user, or operator, has moved the router or mount to center the desired joint or shape on the workpiece. A common method of fitting the joint has been to cut the mortise first then to have adjusted the size of the tenon for the proper fit. This common method has required trial and error to find the desired fit each time a similar joint has been cut. A prior method of aligning a template, or templates, so that they have been centered on a template holder, has involved a more time-consuming effort of attempting to center the template, or templates, on the template holder using a ruler and a straight-edge combined to assure that the template is located in the horizontal center of the template holder in order to facilitate greater uniformity of cuts and carves.

With these common methods, there have often been required more manual measuring, multiple test cuts, and fine-tuning before a cut has been accurately centered. Of course, a downside of such a system has been wasted material, more time-consuming measuring, uncertainty in the process of cutting, and this has also resulted in a final product that has frequently not been as precise as would otherwise have been desirable. This in turn has led to woodworking joints, for example, such as mortise and tenon, dovetail, and box joints, that have not been as durable and have not been as accurately-fitting as would otherwise have been desirable. Or, to attain the same level of precision as the present invention would have taken much longer for set-up and multiple test cuts.

Further, while many prior art templates available today have been factory-supplied and are of good quality, nevertheless imperfections in such factory-supplied templates as shown at 18 on FIG. 1C, or in custom-made templates, have been transferred to the cut or carving at full scale. This in turn has provided a lower quality, less durable, or slower output in design and functionality than would otherwise have been desirable.

SUMMARY OF THE INVENTION

A PantoRouter™-type system is advantageous over the prior art, since the aforementioned imperfections in a template are minimized by a reduction in scale of cutting movements, and hence such a system enables a cleaner and more precise cut. And a cleaner, more precise cut, results in a more pleasing, accurate, repeatable and durable resulting workpiece joinery.

The invention shown, described and claimed herein addresses the problems of prior art router template systems, and it contributes to a more accurate, efficient, repeatable, pleasing appearance, and faster cut on a workpiece, as well as safer operating environments for operators. The invention is preferably used with a pantographic-type router mount with a 2:1 mechanical advantage over the router, and this mechanical advantage gives the operator control and precision superior to any other manually-controlled means of operation.

In accordance with an aspect of the invention, there is provided a tapered relationship between a template and a guide bearing for following the template, wherein preferably the templates, or template, are mounted on a moveable template holder system, or armature, mounted on a moveable or stationary carriage, and wherein preferably the guide bearing, for following the template, is located on a pantographic mount.

In accordance with a first embodiment of this aspect of the invention, there is provided a template which is stepped and/or tapered, either on an inside surface, or on an outside surface, or optionally on both inside and outside surfaces, to allow micro-adjustments to cuts, or carvings, in the workpiece to allow greater precision, for example as in joining two workpieces together. Thus, the guide bearing can be moved up or down (in or out on) the steps or taper on the template, which creates a larger or smaller cut in the workpiece by the router bit.

Thus, in accordance with a first embodiment of the invention in accordance with this aspect of the invention, there is provided a router guide template comprising: a base portion; a top portion; and at least one of an exterior surface interconnecting the base portion and the top portion along an outer periphery of the template and an interior surface interconnecting the base portion and the top portion along an inner periphery of the template, wherein the at least one of the exterior surface and the interior surface is continuously tapered or stepped between the base portion and the top portion, and wherein the base portion is adapted for removable and adjustable interconnection with a template holder. In those templates having an interior surface, the interior surface may be tapered, not tapered, or stepped, and the interior surface and the base portion together may form a concave, stadium bowl-shaped interior in the case of a stadium-shaped templates common for creating mortise and tenon-type joinery.

The stadium shape is a geometric figure consisting of a rectangle with top and bottom lengths a, and the ends of which are capped off with semi-circles of radius r. The area of a stadium is therefore given by $A=\pi r2+2ra$, and the perimeter by $p=2\ (\pi r+a)$. While a stadium-shaped template, with a stadium-shaped outer periphery and a stadium-shaped inner periphery, or stepped inner periphery, is commonly, and even preferably employed in mortise and tenon joinery creation, it will be appreciated that other shapes, such as elliptical, circular, square, round, curved, or other shape appropriate to the desired design outcome, whether for joinery or otherwise, may also be employed with the present invention without departing from its true scope as claimed. Therefore, where stadium is mainly used herein to describe the shapes of the outer and inner peripheries of templates herein (and stadium may be interchangeably used with elliptical herein as pertaining to the drawings), it will be appreciated that elliptical, circular, square, or other basic shapes in accordance with a desired design outcome, whether for joinery or otherwise, may also be substituted without limiting the invention as claimed.

Combining the outside surface (tenon template) together with the inside surface (mortise template) in a single template allows the operator to cut both mortise and tenon joints using the same setup, unlike prior art templates, which have required multiple additional steps (and therefore increased errors and time to set up) by an operator to achieve the same result.

In an alternative embodiment of this aspect of the invention, further comprising both an exterior surface and an interior surface formed by concave stepped-bowl-like edges and a base portion, where the interior surface actually comprises stepped interior surfaces, each surface forming in cross section a stadium (to form larger (upper) and smaller (lower) stadiums having partially concentric end portions) in cross section and having a larger circumference upper interior surface preferably at least at ends of the stadium shape thereof, and a smaller circumference lower interior surface also forming an inner stadium in cross section. In this embodiment, preferably an intermediate portion (i.e., the longer edges of the stadium bowl-shaped interior) of the interior surfaces forming the stadium-shaped concave, stepped-bowl-like edges are preferably the same width for both the upper interior surface and the lower interior surface, but there preferably is a step at each end in the interior portion of this embodiment of the template which is formed in between the two interior surfaces at each end of the stadium-bowl-shaped interior surfaces. This configuration of template allows the creation of a mortise having a larger or smaller width to allow more or less adjustability of the mortise and tenon joint.

Thus, in accordance with this embodiment and aspect of the invention, there is provided a router guide template, further comprising both an exterior surface and an interior surface, wherein the interior surface further comprises a plurality of stepped interior surfaces, an upper interior surface generally describing in cross section a stadium, or alternatively an elongated ellipse, having first and second ends and an elongated middle portion and a lower interior surface generally describing in cross section a stadium having first and second ends and an elongated middle portion, wherein at least the ends of the lower interior surface comprise a smaller circumference surface than at least the ends of the upper interior surface such that an intermediate step is formed at least adjacent the ends of and between the upper interior surface and the lower interior surface. Further, in this alternative embodiment, one or more of the stepped interior surfaces may also be tapered.

Referring back to the first embodiment described above in accordance with this aspect of the invention, both the exterior surface and the interior surface of the router guide template may be continuously tapered between the base portion and the top portion, and in this case at least a portion of the exterior continuous surface may be continuously tapered inwardly from the base portion to the top portion, and further in such a case where the interior surface is also tapered, a corresponding portion of that interior continuous surface may also be continuously tapered outwardly from the base portion to the top portion.

Preferably, the taper of the router guide template of this aspect of the invention comprises a continuously-tapered exterior surface. And where the interior surface of such a router guide template is also tapered (optionally), it too may be continuously-tapered. Further, the continuous tapers may extend around the entire exterior and/or interior peripheries, respectively, of the template.

It will be appreciated that different bit diameters used in a router impact the size of a template to be used. Thus, it is commonly understood by those skilled in the art that to determine template size, the formula for determining the template size for a Tenon=2(Tenon Width+Bit Diameter)−Guide Bearing Diameter, whereas the formula for determining the template size for the Mortise=2(Mortise Width−Bit Diameter)−Guide Bearing Diameter. Further, it will be appreciated that the router guide template tapers preferably comprise a taper of between 0.1 degree and 25 degrees to allow for micro-adjustment of cuts and carvings.

The tapered templates in accordance with this aspect of the invention on the pantographic mount are precisely calculated but approximately double the desired cut so that any imperfection in the template is translated only half-scale to the workpiece, and router control requires less (approximately half) the effort, which as described further below is safer and more accurate. Thus, not only are imperfections in a template minimized to the degree of 2:1 in the final product of the workpiece, but the 2:1 mechanical advantage in the pantograph system further facilitates the ease and safety with which an operator can perform cutting and carving operations using such a system. This is in part because, in fact, there is even a greater mechanical advantage than 2:1 that is achieved with a pantograph-type router system comparing the operator handle relative to the cutting blade output. Thus, the tapered templates provided in accordance with this aspect of the invention serve to facilitate the ease, accuracy and increased safety of routing operations with their use in connection with a pantograph-type router system.

In an alternative embodiment of this aspect of the disclosure, a guide bearing itself can also be tapered to be used as part of a router template guidance system having a combination guide bearing and a preferably non-tapered template, or a tapered template, for use with a router with a mechanical advantage between the guide bearing and a router bit to also allow micro-adjusting of the size and location of a cut or carve on the workpiece upon moving of the guide bearing relative to the template and template holder, or the template holder and template relative to the guide bearing, to also allow micro-adjusting of the size and location of the cut or carve on the workpiece. Thus, in accordance with this aspect of the invention, there is provided a router template guidance system having a combination guide bearing and guide template adapted for use with a router with a mechanical advantage between the guide bearing and a router bit, comprising: a template comprising an upper portion, a lower portion, and at least one exterior surface interconnecting the upper portion and the lower portion, said template further comprising at least one interior surface interconnecting the upper portion and the lower portion of the template; and a guide bearing comprising an exterior surface having a taper thereon adapted for following in contact with the exterior surface and the interior surface of the template.

Preferably in accordance with the combination guide bearing and guide template of this aspect of the invention, the guide bearing is a guide bearing wheel, and the taper of the guide bearing exterior surface preferably extends around the entire exterior guide bearing wheel, or roller, surface and is adapted for contact use with the interior and exterior surfaces of the template to guide a router blade for creating a tenon on a workpiece corresponding with the interior of the template, and for creating a mortise on another workpiece corresponding with the exterior of the template, the tenon and the mortise being matched in size and location on the workpieces in order to interconnect the workpieces.

In accordance with an aspect and embodiment of the disclosure, there is provided a router template guidance system further comprising a guide bearing assembly, the guide bearing assembly comprising a shaft for carrying the guide bearing, and a collar adapted to be relocatably lockable at varying locations along the shaft, the shaft being releasably and variably locatable relative to the router, the guide bearing assembly thus being easily repeatably relocatable to a pre-set position.

Such guide bearing assembly is adapted to be easily repeatably relocatably lockable at varying locations along the shaft, the shaft being releasably and variably locatable relative to the router, the guide bearing assembly being easily relocatable to a pre-set position, whether applied to a tapered guide bearing or a non-tapered guide bearing.

In accordance with another aspect and embodiment of the disclosure, there is provided a router template guide bearing assembly adapted for use with a pantographic router mount frame. The guide bearing assembly in accordance with this aspect of the disclosure comprises a shaft having first and second ends; a guide bearing rotatably mounted on a first end of the shaft; and a annular collar adapted to be relocatably mounted at an intermediate location between the first and second ends on the shaft, the shaft, and hence the guide bearing wheel, being adaptable for installation on an arm of the pantographic router mount to enable ready adjustability of the shaft and guide bearing relative to a template for guiding a user in making cuts and carves with the router.

In accordance with an embodiment of the disclosure, the guide bearing is a guide bearing wheel, and wherein the taper of the guide bearing extends around the entire exterior wheel surface and is adapted for contact use with the interior and exterior surfaces of the template to guide a router blade for creating a tenon on a workpiece corresponding with the exterior of the template, and for creating a mortise on another workpiece corresponding with the interior of the template, the tenon and the mortise being matched in size and location on the workpieces in order to interconnect the workpieces.

In accordance with another aspect of the invention, there is further provided, in addition to the template system of either of the aspects of the invention described above, a template holder in combination with the router guide template, the template holder having a plurality of support post members, preferably two such post members at either end of the cross member (to allow clearance of a router motor in-between the post members), and a cross member interconnecting the support post members and having a plurality of linear keyed slots therein, wherein the base portion of the template is adapted for removable and adjustable interconnection with the linear keyed slots of the cross member of the template holder. Thus, in accordance with this aspect of the invention, the tapered templates are able to be mounted adjustably and removably on one or more of the template holder's plurality of keyed slots or tracks. Into one or more of these cross member keyed slots, the invention provides that one or more adjustable keyed portions (i.e., an expanded head or nut on the end of a threaded bolt passing through the base portion of each template) and alignment guides (i.e., tapered tenons) on the base portion (i.e., a back portion) of each template may be removeably and slideably placed and tightened or loosed. This is similar to a keyed tongue and groove type relationship between each template and the keyed slots of the template holder cross member, to allow substantial adjustability of each template on the template holder. The keyed portions of each template are thus able to be tightened or loosed, by fixing or loosening, respectively, the keyed portion of each template as by screwing the threaded post within the template base, to be able to fix, or install, adjust or remove, a template relative to one or more of the tracks on the template holder. The readily adjustable tapered templates of the foregoing aspects of the invention allow for greater ease of use of the router to accomplish desired, and more accurate, cuts on a workpiece.

In accordance with another aspect of the invention, an improved system and method of more easily centering templates on an improved template holder, to allow greater ease and efficiency in making more accurate cuts and carves with a router, is provided comprising a drilled, or otherwise formed, centered hole in at least one, or preferably each, of the slotted tracks of the template holder, wherein the centered hole, or holes, are each located exactly midway between each end of the template holder cross member. In this way, a screw hole, or alignment hole, of a template may be aligned with one of the series of centered holes, as with a pin or a shaft (such as the guide bearing shaft) able to pass through, in order to center the template horizontally on the template holder.

Accordingly, in accordance with this aspect of the invention, there is provided a pantograph-type woodworking router guide template holder, comprising: a plurality of post members having at least one keyed slot defined along and extending at least a portion of the length of each post member and adapted for interconnection with a pantograph carriage, at least one cross member having first and second ends and adjustably interconnecting the plurality of post members, the template holder cross member further comprising at least one linear keyed slot, the template holder cross member defining a hole centered midway between the first and second ends of the template holder cross member and adapted for enabling centering a template by aligning a central hole of the template with the hole centered midway, and a plurality of clamps for adjustably fixing the cross member relative to the posts.

The template holder in accordance with this aspect of the invention may be provided either alone, or in combination with a template having a base portion and a top portion, the template further comprising exterior and interior continuous surfaces interconnecting the base and top portions of the template along an outer periphery and an inner periphery of the template, respectively, to facilitate joinery cuts and carves with a single template, the base portion adapted for removable and adjustable interconnection with the at least one linear keyed slot of the cross member, the template defining a template centering hole centered within the template and adapted for aligning with the hole centered between the first and second ends of the template holder cross member.

In an embodiment, the pantograph-type woodworking router guide template and template holder combination is provided wherein at least a portion of at least one of the exterior continuous surface and the interior continuous is tapered from the base portion to the top portion, and wherein the template has a locking key on either side of the template centering hole adapted for removeably locking the template onto the template holder cross member with the template centering hole of the template aligned with the hole centered midway between the first and second ends of the template holder cross member.

In an embodiment, the pantograph-type woodworking router guide template and template holder combination is provided wherein the interior surface further comprises a stepped interior surface having a larger circumference upper interior surface and a smaller circumference lower interior surface, and wherein the template has a locking key on either side of the template centering hole adapted for removeably locking the template onto the template holder cross member with the template centering hole of the template aligned with the hole centered midway between the first and second ends of the template holder cross member.

In accordance with an embodiment of the invention, there is provided a woodworking router guide template and template holder combination, wherein at least one of the exterior continuous surface and the interior continuous surface is tapered between the base portion and the top portion, and wherein the template has a locking key on each side of the template centering hole adapted for removeably locking the template onto the template holder cross member with the template centering hole of the template aligned with the hole centered midway between the first and second ends of the template holder cross member.

In accordance with an embodiment of the invention, there is provided a pantograph-type woodworking router guide template and template holder combination, wherein both the exterior continuous surface and the interior continuous surface are tapered, wherein the exterior continuous surface is tapered inwardly from the base portion to the top portion, wherein the interior continuous surface is tapered outwardly from the base portion to the top portion, wherein the taper of each of the continuously-tapered exterior and interior surfaces extends around the entire exterior and interior peripheries, respectively, of the template, and wherein the template has a locking key on each side of the template centering hole adapted for removeably locking the template onto the template holder cross member with the template centering hole of the template aligned with the hole centered midway between the first and second ends of the template holder cross member.

Further, in accordance with an embodiment of the invention, there is provided an improved method of horizontally centering templates on the template holder cross member comprising the following steps: inserting a keyed template tenon into a slot of the template holder, sliding the template in the slot to near the horizontal center of the template holder, pinning with a pin, or shaft, a center hole of the template to a corresponding center hole in the template holder so as to locate the template at a centered location on the template holder, tightening a locking mechanism of each key associated with the template to fix the template in place at the centered location on the template holder.

The system and method centering the template in accordance with this aspect of the invention makes centering templates on template holders easier, and thus the process of installing templates centered on template holders is less time consuming than prior art methods of installing templates on template holders.

In accordance with another aspect of the invention, a thickness gauge for allowing the operator to quickly, accurately and easily center the height of cuts in a Y-axis on a workpiece is located on the template holder support post, or cross-member (see FIG. 10 for an axis diagram for orientation references for this specification). Thus, the operator is allowed to insert the workpiece, or sample stock of a same thickness as the workpiece, further allowing the operator to lock the template holder in place and to automatically center the cut, joint or shape in the workpiece, in order to properly adjust the desired height of the router cutting blade relative to the workpiece before beginning cutting operations. The thickness of the workpiece or sample measured by the gauge is doubled in a 2:1 pantograph system so that imperfections in the surface are translated at half-scale to the workpiece, thus improving precision of cuts and carves on the workpiece.

Thus, in accordance with this aspect of the invention, the template holder of the router guide template system further comprises a thickness gauge for use with a 2:1-ratio-type, pantograph-type router system. The thickness gauge of this aspect of the invention is for enabling centering cuts and carvings in a Y-axis of a workpiece, the thickness gauge preferably further comprising a plurality of clamps on one of the cross member or the support posts. The thickness gauge of this aspect of the invention is adapted for holding a sample of stock that is the same thickness as the intended workpiece such that the cutting blade of the router is adapted to be positioned so as to create one or more of a mortise and a tenon in a center location of the workpiece and another workpiece.

In accordance with yet another aspect and embodiment of the invention, each tapered template is provided in a plurality of segments, wherein multiple segments of tapered templates may be mixed, matched, and combined to form differing shapes and sizes of cuts. Thus, in accordance with this aspect of the invention, there is provided a router guide template, wherein the template is comprised of a plurality of segments of tapered templates. Further, each such segment of tapered template comprises a top portion, a base portion, and at least one of an exterior continuously-tapered or stepped surface interconnecting the base portion and the top portion along an outer periphery and an interior continuously-tapered or stepped surface interconnecting the base portion and the top portion along an inner periphery. Still further, each such segment of tapered or stepped template further comprises two mating end portions such that the plurality of segments of tapered templates may be removably and adjustably attached to the template holder in end-to-end fashion. When combined in this manner, the top portions, the base portions, any exterior continuously-tapered surfaces and interior continuously-tapered surfaces of each segment are mated end-to-end with an end of another segment forming a continuous top portion, a continuous base portion, and one of an exterior continuously-tapered surface and an interior continuously-tapered surface between each mated segment. When the entire plurality of segments are thus mated end-to-end together they form a complete router guide template with a continuous top portion, a continuous base portion, and at least one of an exterior continuously-tapered or stepped surface, and an interior continuously-tapered, non-tapered, or stepped surface. This aspect of the invention further supports and enables greater ease and flexibility in forming templates to accomplish a wider range of joining, or decorative, cuts in the workpiece.

In accordance with one or more aspects of the invention provided above, in an embodiment of the invention, there is provided: A pantograph-type woodworking router guide template and template holder combination, comprising: a template holder comprising a plurality of post members having at least one keyed slot defined along and extending at least a portion of the length of each post member and adapted for interconnection with a pantograph carriage, the template holder further comprising at least one cross member adjustably interconnecting the plurality of post members, the template holder cross member further comprising means for removeably retaining at least one template, wherein the template holder further comprises a plurality of clamps for adjustably fixing the cross member relative to the posts; a template having a base portion and a top portion, the template further comprising exterior and interior continuous surfaces interconnecting the base and top portions of the template along an outer periphery and an inner periphery of the template, respectively, the base portion being adapted for removable and adjustable interconnection with the cross member of the template. The post members of the template holder are typically connected to the carriage of the pantograph with a plurality of bolts.

In accordance with an alternative, embodiment of one or more of the foregoing aspects of the invention, there is provided a pantograph-type woodworking router guide template and template holder combination, wherein the interior surface and exterior surface further comprises a stepped interior surface having a larger circumference upper interior surface and a smaller circumference lower interior surface. This configuration allows the creation of a larger or smaller mortise to allow for adjustment of the tenon in the mortise.

Preferably, in accordance with an embodiment of a pantograph-type woodworking router guide template and template holder combination, either or both the exterior continuous surface and the interior continuous surface are one of non-tapered, tapered or stepped.

Further, in accordance with another embodiment of a pantograph-type woodworking router guide template and template holder combination, both the exterior continuous surface and the interior continuous surface are tapered, wherein the exterior continuous surface is tapered inwardly from the base portion to the top portion, wherein the interior continuous surface is tapered outwardly from the base portion to the top portion, and wherein the taper of each of the continuously-tapered exterior and interior surfaces extends around the entire exterior and interior peripheries, respectively, of the template.

Preferably, in connection with this pantograph-type woodworking router guide template and template holder combination embodiment of the invention in accordance with any of the foregoing aspects of the invention, each of the exterior continuous surface and the interior continuous surface is continuously tapered or stepped, and preferably the taper or step of each of the continuously-tapered or stepped exterior and interior surfaces extends around the entire exterior and interior peripheries, respectively, of the template.

However, as described in connection with interior stepped surfaces above in connection with another embodiment and aspect of the invention, the interior of this embodiment and aspect of the invention may be tapered, non-tapered, or preferably it may be stepped at the ends of the template. Thus, in those templates having an interior surface, where the interior surface may be tapered, non-tapered, or stepped, the interior surface and the base portion together may form a concave, stadium-bowl-shaped interior in the case of a stadium-shaped template common for creating mortise and tenon-type joinery. Thus, in this latter embodiment, the interior-concave-stadium-bowl-shaped end portions of the interior portion of the template are preferably stepped.

And, thus, in the alternative embodiment of this aspect of the invention, further comprising both an exterior surface and an interior surface formed by concave stepped-bowl-like edges and a base portion, where the interior surface actually comprises stepped interior surfaces, each surface forming a stadium (to form larger (upper) and smaller (lower) stadiums having partially concentric end portions) in cross section and having a larger circumference upper interior surface preferably at least at ends of the stadium shape thereof, and a smaller circumference lower interior surface also forming an inner stadium in cross section. In this embodiment, preferably an intermediate portion (i.e., the longer edges of the stadium bowl-shaped interior) of the interior surfaces forming the stadium-shaped concave, stepped-bowl-like edges are preferably the same width for both the upper interior surface and the lower interior surface, but there preferably is a step at each end in the interior portion of this embodiment of the template which is formed in between the two interior surfaces at each end of the stadium-bowl-shaped interior surfaces. This configuration of template allows the creation of a mortise having a larger or smaller width to allow more or less adjustability of the mortise and tenon joint. In this alternative embodiment, one or more of the stepped interior surfaces may also be tapered, elliptical, square, round, curved, or other shape appropriate to the desired design outcome, and whether for joinery cuts or otherwise.

Further, as described previously in accordance with one or more previously-described embodiments and aspects of the invention, preferably the opposing exterior and interior continuous surface tapers of this embodiment of the invention may be generally corresponding and opposed to each other, such that an innermost portion of the exterior and interior continuously-tapered surfaces near the top of the template (as well as near the base of the template and also in-between the top and the base of the template) may generally correspond so as to generally guide the operator in cutting and carving.

Still further, preferably in connection with this embodiment of the invention, the cross member interconnecting the support post members defines a plurality of linear keyed slots, and wherein the base portion of the template is adapted for removable and adjustable interconnection with the linear keyed slots of the cross member of the template holder.

Still further, preferably, in connection with this embodiment of any of the foregoing aspects of the invention, the template holder further comprises a thickness gauge on a 2:1-ratio-type, pantograph-type routing woodworking system, for enabling centering cuts and carvings in a Y-axis of a first workpiece, the thickness gauge further comprising a plurality of clamps on one of the cross member or the support posts and adapted for holding a sample of stock that is the same thickness as the intended workpiece such that the cutting blade of the router is adapted to be positioned so as to create one of a mortise and tenon in the center of the workpiece and another workpiece.

Further, in accordance with yet another alternative embodiment of the invention in accordance with any of the foregoing aspects of the invention, the template is comprised of a plurality of segments of tapered templates, wherein each segment of tapered template comprises a top portion, a base portion, an exterior (optionally continuously-tapered) surface interconnecting the base portion and the top portion along an outer periphery, and an interior (optionally continuously-tapered) surface interconnecting the base portion and the top portion along an inner periphery, and wherein each segment of template further comprises two mating end portions such that the plurality of segments of tapered templates may be removably and adjustably attached to the template holder in end-to-end fashion such that the top portions, the base portions, the exterior (optionally continuously-tapered) surfaces and the interior (optionally continuously-tapered) surfaces of each segment mated with an end to another segment end forms a continuous top portion, a continuous base portion, a continuous exterior (optionally continuously-tapered) surface and a continuous interior (optionally continuously-tapered) surface, and such that when the plurality of segments are mated end-to-end together they form a complete router guide template with a continuous top portion, a continuous base portion, a continuous exterior (optionally continuously-tapered) surface, and a continuous interior (optionally continuously-tapered) surface.

The tapered-template system in accordance with one or more aspects and embodiments of the invention summarized above addresses the problem of inaccurate or complicated joinery using a router and fixed-size guides or templates, thus enabling quicker, more accurate, safer, and easier-to-make joinery cuts, whether dovetail, mortise and tenon, or box joint cuts. No other known system provides similar micro-adjustment as provided with the tapered templates of the present invention. With such a system of the present invention, an operator is enabled in adjusting the depth of the guide bearing on a pantograph-type router, moving it in or out to engage a different portion of a taper on either or both an exterior surface and an interior surface of a template, to enable easy-to-make and precise joinery cuts.

Further, the tapered-template system in accordance with one or more aspects and embodiments of the invention summarized above enables users in easy and quick micro-adjustments to proposed cuts and carves.

Still further, the tapered-template system in accordance with yet another aspect of the invention enables operators to more quickly and easily center the thickness (Y-axis) of a joint or shape in a workpiece. Thus, one or more of the foregoing aspects and embodiments of the invention helps users to more quickly and accurately center their work on an intended workpiece. With the use of the tapered-template system in accordance with one or more aspects and/or embodiments of the invention, operators are enabled in greater control over routers using a pantographic or non-pantographic router mount, thus making such template-guided routers easier to use and more accurate.

The tapered template system in accordance with one or more aspects and embodiments of the invention enables operators in installing and changing templates and template holders, thus facilitating the work of setting up, creating, and taking down, a project.

The subject matter of the present disclosure is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTION OF THE DRAWINGS

In consideration of the following detailed description of various embodiments, the disclosure may be more completely understood in connection with the following drawings.

FIG. 1A is a perspective view of a prior art template for a router;

FIG. 1B is a perspective view of another prior art template for a router;

FIG. 1C is a plan view of another prior art template for a router;

FIG. 1D is a front view of a router with a prior art guide bearing thereon;

FIG. 3A is a perspective view of a tapered template of a template guide system in accordance with an embodiment and aspect of the disclosure;

FIG. 3B is a top plan view of a tapered template of a template guide system in accordance with an embodiment and aspect of the disclosure;

FIG. 3C is a bottom plan view of a tapered template of a template guide system in accordance with an embodiment and aspect of the disclosure;

FIG. 3D is a side elevation view of a tapered template of a template guide system in accordance with an embodiment and aspect of the disclosure;

FIG. 3E is a front elevation view of a tapered template of a template guide system in accordance with an embodiment and aspect of the disclosure;

DETAILED DESCRIPTION OF THE INVENTION

Referring specifically to FIGS. 2 and 3A-E, a template holder system 20 in accordance with one or more aspects of the disclosure preferably comprises a plurality of stands, or posts, 22 (preferably there are provided two such posts), and preferably a single cross member 24 interconnecting the two posts. The template holder system 20 may be comprised of a single post 22 and cross member 24, or more posts 22 may be employed as well, without departing from the true scope and spirit of the disclosure as claimed. However, it will be appreciated by those skilled in the art that two such posts is preferable from the standpoint of simplicity of use, rigidity and sturdiness of the resulting template guide system 20.

Figure 5:
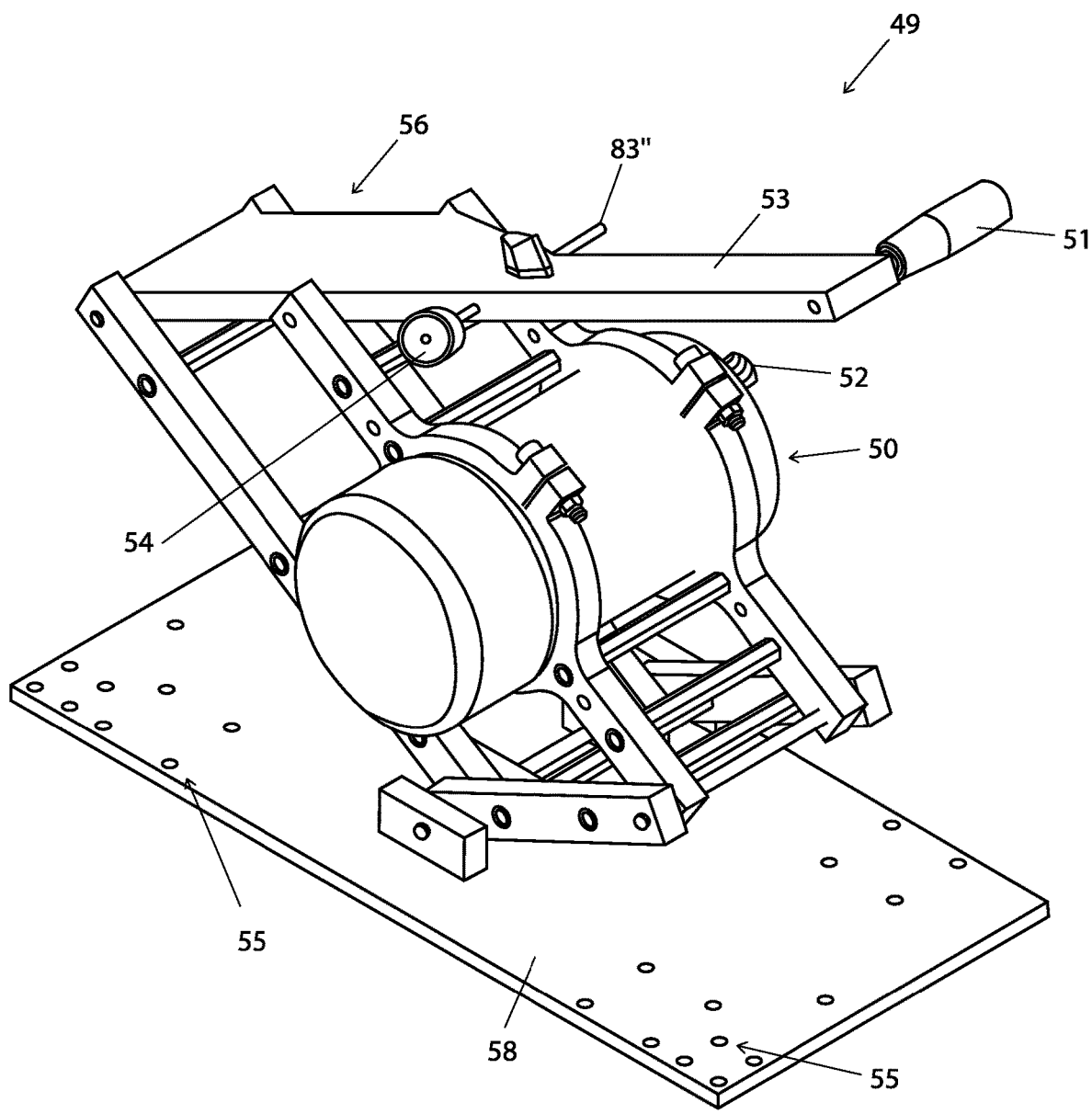
FIG. 5 is a perspective view of a pantograph-type router on a mount, having a standard guide bearing adjustably mounted thereon, and adapted for use with, and in combination with, a tapered template system in accordance with an embodiment and aspect of the disclosure.

Each of the posts 22 of the template holder system 20 preferably has key slots, or grooves, 26 therein for facilitating alignment of the cross-member 24 thereon, for facilitating the adjustment of the template holder for use as described further hereafter for height adjustment, as well as for attaching the posts with bolts (four bolts for each post) to holes 55 in the router or pantograph mount 58 (FIG. 5).

The cross-member 24 of the template holder system 20 comprises measurement indicia 28 on an upper edge surface 7, and/or lower edge surface 5, thereon, either inch or metric scale, to assist with centering, or otherwise locating, a tapered template 30 on the template holder in order to allow correspondingly-located cuts on workpieces. Indicia 31 may also be provided on the posts 22 as well, in order to facilitate measurement of the cross member 24 and height guide 27 position, as discussed further below, relative to the posts 22.

The cross-member 24 of the template holder system 20 further preferably comprises three or more horizontal mounting grooves, or keyed slots, 29, made either of plastic or metal, such as aluminum. Each of the templates 30, 30' (as well as other templates described herein) have corresponding tapered tenons, or tapered tongues, 44 to help orient and fix the templates in the keyed slots. The taper of each of these orienting tenons 44, 44' is provided as slightly larger at a base of each tenon than at a tip of each tenon, as shown in FIG. 3D, so that upon placement and tightening of the template 30, 30' onto the template holder 24 as further described below, the templates are snugly attached fixed in the slots 29 of the template holder.

These tapered tenons 44 may be oriented longitudinally the length of the template 30 as shown in FIG. 3C, the keyed slots 29 are preferably spaced about ¾ inch, or about 20 mm, apart which provides optimal spacing for the templates 30, 30' in order to place single or multiple ½", ⅜", or ¼" thick mortise and tenon joints in dimensional lumber common to North America, such as 2×4, 2×6, 2×8, etc. Further, paired mortise and tenon joints may be created with a stacked manufacturing configuration where two templates are located on the cross member 24. The template holder 20 also accommodates non-tapered, tapered or stepped templates, as further described herein in accordance with one or more aspects of the disclosure, to make fixed or variably-spaced dovetail and box joints. The tapered templates 30 may be tapered on the exterior and interior surfaces to allow micro-adjustment of the joinery.

The template holder 20 further comprises an L-shaped side angle system 19 mounted, as with screws to each side of the template holder cross member 24, and the template holder cross member is partially retained within, and maintained squared relative to, the two L-shaped side angles by an outer vertically-oriented lip 11 on each L-shaped angle and engaging either end of the cross member. The L-shaped angle system 19, comprises left and right such L-shaped angles on either side of the template holder cross member. The L-shaped angles 19 and cross member 24, are removably fixed together with tightening screws so that the L-shaped angles and cross member combination is fixed together and adjustable as a unit, and alternatively able to be fixed, or locked at a certain height, relative to the posts 22 with the use of clamps 21, each clamp having a tightening lever 23.

The angles 19 and cross member 24 combination are able to be adjusted to an appropriate height according to indicia 31 on one of the posts 22, the workpiece used temporarily for a height measurement as further described below, or a representative sample workpiece of the same thickness as the workpiece. Thus, the system of clamps 21 each have a tightening lever 23 for the operator to actuate to adjust the template holder cross member 24 position relative to the posts 22, the pantograph carriage 58, and thus the workpiece, via the L-shaped angles 19 fixed to the template holder cross member.

Figure 10:
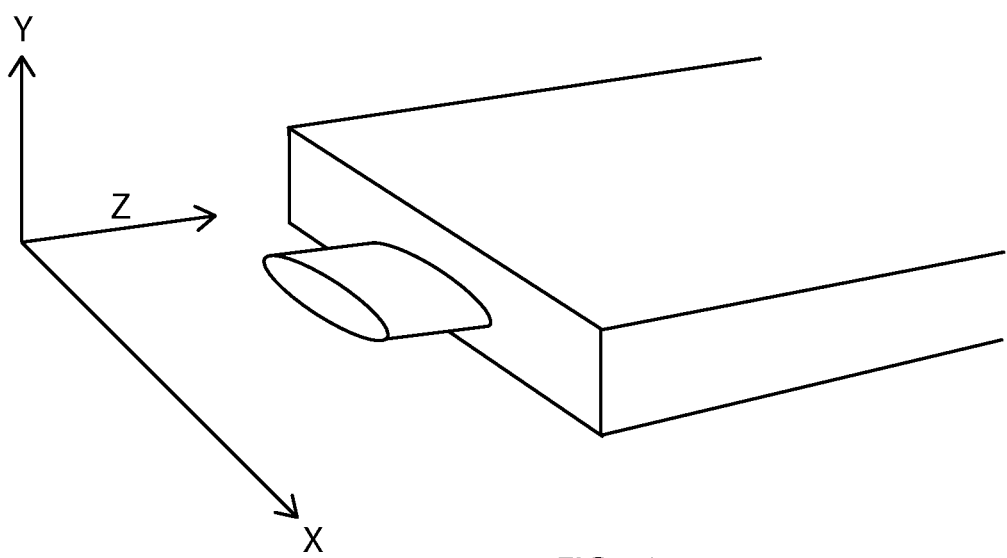
FIG. 10 is an illustrative perspective view of a tenon joint on a workpiece and further illustrating reference X, Y, and Z axes referred to in this specification.

Thus, there is also provided a height measurement clamp, or thickness gauge, 27 for holding a reference, or sample, workpiece/stock 3, to allow simple adjustment of the height of the cross member 24 and attached template 30 relative to the cross member, the routing table 58, and thus the actual workpiece on which cutting or carving is to be performed. The thickness gauge 27 allows the operator to quickly, accurately and easily center a cut or carving in the Y-axis of an actual workpiece (see FIG. 10 for an axis diagram for proper orientation for this specification).

This is accomplished by first referencing the upper surface of the thickness gauge 27 at the cutting table surface, and then by adding the sample/workpiece stock 3, followed by moving the cross member 24 (via the L-shaped angles sliding along the posts 22) down so that an underside of the cross member 24 comes to rest on the upper surface of the reference stock 3. Thereafter, the operator is able to fix the cross member 24 at that location using the levers 23 of clamps 21 which thus clamp the L-shaped angles 19 and attached cross member 24 to the posts 22 at the desired height. The thickness gauge 27 is built into the template holder system 20, preferably mounted on a template holder support post 22, or cross member 24. Thus the thickness of the workpiece or sample is measured by the gauge 27 to accurately position or center the joinery on the workpiece.

The clamps 21 are both for adjusting the template holder 20 and operating the cross member 24 and L-shaped angles 19 combination relative to the thickness gauge 27. The thickness gauge 27 is attached, and independently slides into, and is held in place within, the grooves 26 in the posts 22, via a screw 27a. The side angle assembly 19 must be aligned on entry into the groove 26 in the posts 22, and upon tightening of the clamp 21 via the lever 23. Therefore a part of the disclosure offsets the clamps 21 so one may be aligned at a time. This makes changing template holders 20 easier and faster. Thus the template holder and system 20, 21, 22, 24, 27, 30, 54, as well as inventive parts, combinations and other embodiments thereof, enables operators to more quickly and easily center the thickness (Y-axis) of a joint or shape in a workpiece. Thus, this aspect, or these aspects, of the disclosure helps users to more quickly and accurately center their work on an intended workpiece and allows for greater precision in cuts and carves.

Figure 14:
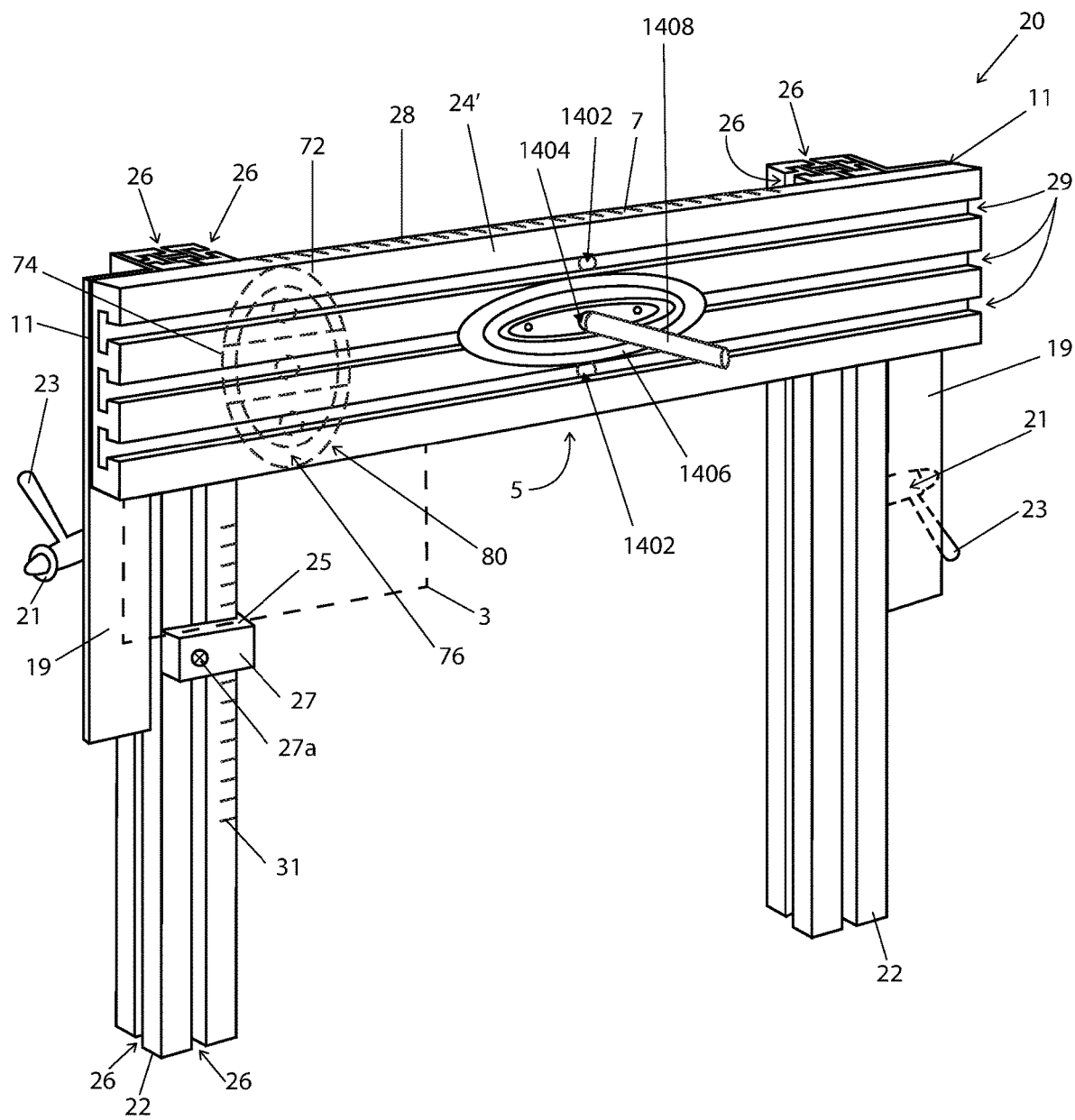
FIG. 14 is a perspective view of an alternate adjustable template holder for a template guide system in accordance with an embodiment and aspect of the disclosure.

Referring to FIG. 14, in accordance with another aspect of the invention, there is provided an improved cross member 24' for more easily centering templates on the template holder cross member, to allow greater ease and efficiency in making more accurate cuts and carves with a router. Thus, as shown in FIG. 14, the template holder cross member 24' is drilled, or there are otherwise formed, preferably a plurality of centered holes 1402, one centered hole in at least one, or preferably each, of the slotted tracks 29 of the template holder, wherein the centered hole, or holes 1402, are each located exactly midway between each end of the template holder cross member in its respective slotted track. In this way, a template 1406 having a central hole 1404, may be aligned with one of the series of centered holes 1402, as with a pin or a shaft 1408 (such as the guide bearing shaft) able to pass through, in order to center the template 1406 horizontally on the template holder 24'.

Accordingly, there is also provided an improved method of horizontally centering templates 1406 on the template holder cross member 24' comprising the following steps: inserting a keyed 42 template tenon 44 (see FIGS. 3C-3E) into a slot 29 of the template holder 24', sliding the template in the slot to near the horizontal center hole 1402 of the template holder, pinning with a pin 1408, or shaft, a central hole 1404 of a template 1406 to a corresponding center hole 1402 in the template holder so as to locate the template 1406 at a centered location on the template holder, tightening a locking mechanism of each key 42 associated with the template to fix the template in place at the centered location on the template holder. The template 1406 is just like template 30, 30', 30'', 30''', except it has a central hole 1404 in it provided adapted to receive the pin 1408 for aligning the central hole 1404 with a corresponding hole 1402 in the template holder 24'

The system and method centering the template 1406 in accordance with this aspect of the invention makes centering templates 1406 on template holders 24' easier, and thus the process of installing templates centered on template holders is less time consuming than prior art methods of installing templates on template holders.

Referring more specifically now to FIGS. 3A-E, there is provided one or more tapered templates 30 (other embodiments, including non-tapered templates, stepped templates, segmented templates, and other types of templates, are discussed hereafter in connection with other figures). Each tapered template 30 comprises a top portion 31, a base portion 33, and one or more continuously-tapered surfaces, exterior, outer continuously-tapered surface 32a, and interior, inner continuously-tapered surface 32b, interconnecting the top portion and the base portion of each tapered template 30. Each continuously-tapered surface 32a, 32b is continuously tapered in the sense that the surface has a continuous taper from the base portion 33 to the top portion 31. In the case of exterior continuously-tapered surface 32a, the taper preferably extends continuously inwardly from the intersecting edge 37 of the base portion 33 and the tapered surface 32a to the intersecting edge 39 of the top portion 31 and the tapered surface 32a. Similarly, in the case of interior continuously-tapered surface 32b, the taper preferably extends continuously outwardly from the intersecting edge 41 of the interior continuously-tapered surface 32b and the base portion 33 to the intersecting edge 43 of the interior continuously-tapered surface 32b and the top portion 31.

In this way, there is provided the ability for microadjustment of cuts and carves because of the fact that, to the degree there are provided tapered surfaces, they are adapted to interface in a continuously-tapered fashion with an adjustable guide bearing 54 (FIGS. 4a and 5) to allow for such continuously-adjustable micro-adjustment.

It will be appreciated by those skilled in the art that the templates described herein may be stadium-shaped, elliptical-shaped or some other shape as shown or described. The terms stadium and elliptical are used somewhat interchangeably herein when describing one or more of the figures. The stadium shape is a geometric figure consisting of a rectangle with top and bottom lengths a, and the ends of which are capped off with semi-circles of radius r. The area of a stadium is therefore given by $A=\pi r^2+2ra$, and the perimeter by $p=2(\pi r+a)$. While a stadium-shaped template, with a stadium-shaped outer periphery and a stadium-shaped inner periphery, or stepped inner periphery, is commonly, and even preferably employed in mortise and tenon joinery creation, it will be appreciated that other shapes, such as elliptical, circular, square, round, curved, or other shape appropriate to the desired design outcome, whether for joinery or otherwise, may also be employed with the present disclosure without departing from its true scope as claimed. Therefore, where stadium is mainly used herein to describe the shapes of the outer and inner peripheries of templates herein (and stadium may be interchangeably used with elliptical herein as pertaining to the drawings), it will be appreciated that elliptical, circular, square, or other basic shapes in accordance with a desired design outcome, whether for joinery or otherwise, may also be substituted without limiting the disclosure as claimed.

Each tapered template 30 is provided with a series of holes 45 adapted for receiving the key system 42 for use in releasably securing each template to the cross member 24 slot 29. The key system 42 further comprises a machine screw 47 preferably having an Allen Wrench or screwdriver slot(s) operable head 49 thereon. In this way, each tapered template 30 is adapted for interchangeable interconnection with a slot 29 of the cross member 24.

Each tapered template 30 is held on the slots 29 of the cross member 24 of the template holder 20 with the use of a releasably tightenable and adjustable key 42 and tapered tenon 44 system associated with each tapered template 30 as shown in FIG. 3E. The releasably tightenable and adjustable key 42 and tapered tenon 44 system may employ the use of multiple keys 42 as shown in FIG. 3E, or a single key 42' as shown in FIGS. 6 B-D. In either case, the tapered tenons 44, together with the key 42, serve to hold the tapered template 30 in aligned position on, and relative to, the template guide system cross member 24.

Figure 7A:
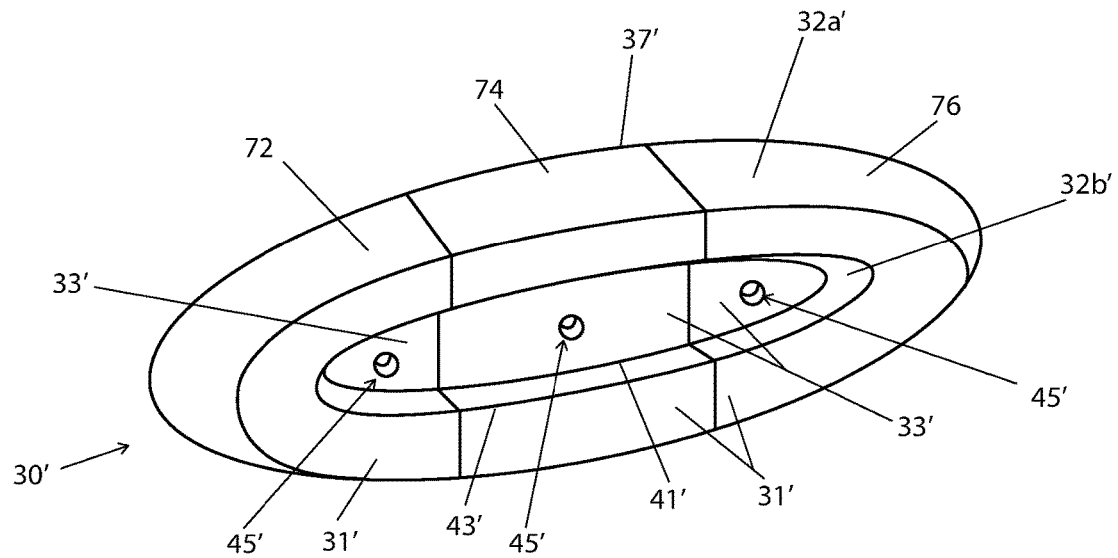
FIG. 7A is a perspective view of a plural-segment tapered template in accordance with an alternative embodiment and aspect of the disclosure.
Figure 7B:
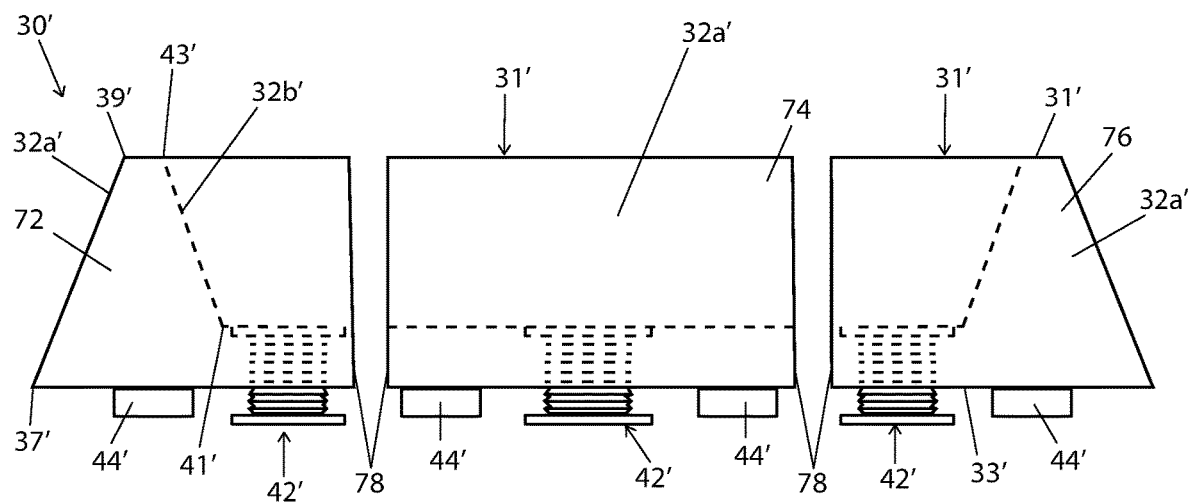
FIG. 7B is a front elevation exploded view of a plural-segment tapered template in accordance with an alternative embodiment and aspect of the disclosure.
Figure 8A:
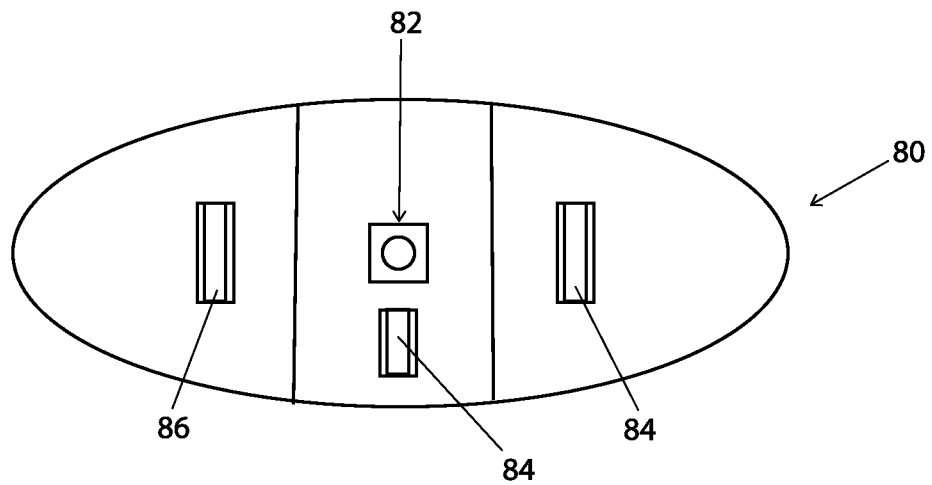
FIG. 8A is a bottom plan view of a base portion of a template adapted for vertical orientation on a template holder in accordance with an alternative embodiment and aspect of the disclosure.

Referring now specifically to FIGS. 7A-B and 8A, in accordance with another embodiment and aspect of the disclosure, there are provided a plurality of segments 72, 74, 76 comprising together a tapered template 30'. It will be appreciated that other types of templates, whether tapered, non-tapered, stepped, angular, or otherwise as discussed in other locations or in connection with other Figures in this specification, may be segmented and/or attached horizontally, vertically, or in angled orientation, to cross member 24 in accordance with an aspect and embodiments of the disclosure, without departing from the scope of the disclosure as claimed.

As with tapered template 30, tapered template 30', when considered with multiple segments fit together end-to-end, also comprises a continuous top portion 31', a continuous base portion 33', and one or more continuously-tapered surfaces, such as exterior, outer continuously-tapered surface 32a', and/or interior, inner continuously-tapered surface 32b', interconnecting the top portion and the base portion of each tapered template 30'. Each continuously-tapered surface 32a'/32b' is continuously tapered in the sense that the surface has a continuous taper from the base portion 33' to the top portion 31'. In the case of exterior continuously-tapered surface 32a', the taper preferably extends continuously inwardly from the intersecting edge 37' of the base portion 33' and the tapered surface 32a' to the intersecting edge 39' of the top portion 31' and the tapered surface 32a'. Similarly, in the case of interior continuously-tapered surface 32b', the taper preferably extends continuously outwardly from the intersecting edge 41' of the interior continuously-tapered surface 32b' and the base portion 33' to the intersecting edge 43' of the interior continuously-tapered surface 32b' and the top portion 31'.

In this way, there is provided a tapered relationship not only between the exterior continuously-tapered surface 32a' and the interior continuously-tapered surface 32b', but there is also provided for micro-adjustment of cuts and carves because of the fact that these tapered surfaces are adapted to interface in a continuously-tapered fashion with an adjustable guide bearing 54 to allow for such continuously-adjustable micro-adjustment.

In FIGS. 7A-B, tapered template 30' differs from tapered template 30 in that tapered template 30' is comprised of a plurality of segments 72, 74, 76. Thus, each of the segments 72, 74, 76 has a top portion 31', a base portion 33', an exterior continuously-tapered surface 32a', an interior continuously-tapered surface 32b', and preferably a hole 45', tapered tenons 44', and key members 42'. Further, each tapered template segment 72, 74, 76 also preferably has at least one cross-section end cut 78, and in some cases (i.e., segment 74) a plurality of cross-section end cuts. Preferably, these cross-section end cuts 78 will match corresponding cross-section end cuts 78, so that two or more segments may be located end-to-end in the slots 29 of cross member 24 (as shown in dotted lines at 30' on FIG. 2) in order to form a complete template 30'.

Thus, it will be appreciated that segments 72, 74, 76, or other segments having differing shapes in order to form desired cuts on a workpiece as will be appreciated by those skilled in the art, may be mixed, matched, and combined to form differing shapes and sizes of cuts. Thus, there is provided a router guide template 31', wherein the template is comprised of a plurality of segments of tapered templates 72, 74, 76. Further, each such segment 72, 74, 76 of tapered template 30' comprises a top portion 31', a base portion 33', and at least one of an exterior continuously-tapered surface 32a' interconnecting the base portion and the top portion along an outer periphery and an interior continuously-tapered surface 32b' interconnecting the base portion and the top portion along an inner periphery.

Still further, each such segment 72, 74, 76 of tapered template 30' further comprises two mating end portions 78 such that the plurality of segments of tapered templates may be removably and adjustably attached to the template holder 24 in end-to-end fashion. When combined in this manner, the top portions 31', the base portions 33', any exterior continuously-tapered surfaces 32a' and interior continuously-tapered surfaces 32b' of each segment 72, 74, 76 are mated end-to-end with an end 78 of another segment forming a continuous top portion 31', a continuous base portion 33', and one of an exterior continuously-tapered surface 32a' and an interior continuously-tapered surface 32b' between each mated segment.

When the entire plurality of segments 72, 74, 76 are thus mated end-to-end together they form a complete router guide template 30' with a continuous top portion 31', a continuous base portion 33', and at least one of an exterior continuously-tapered surface, 32a', an interior continuously-tapered surface 32b', and even a non-tapered interior or exterior surface (e.g., for example if template 81 or 83 of FIG. 8 were to be shown as segmented, since there are not shown guide surface tapers on these templates). This aspect of the disclosure further supports and enables greater ease and flexibility in forming templates 30' to accomplish a wider range of joining, or decorative, cuts in a workpiece.

Each tapered template 30 (30', 30", 30''', 80, 81, 83, 90, 92, etc.) is provided with a series of holes 45 adapted for receiving the key system 42 for use in releasably securing each template to the cross member 24 slot 29. The key system 42 further comprises a threaded post 47 preferably with an Allen Wrench (other screwdriver) operable head 49 thereon. In this way, each template is adapted for interchangeable interconnection with a slot 29 of the cross member 24.

It will be appreciated that any taper of the interior and the exterior tapered surfaces of the templates (e.g., 30) described herein, may beneficially extend along the entire tapered surface (depending upon the desired output of such a guided pantorouter system), both from the base portion (e.g., 33) of the template to the top portion (e.g., 31) of the template, as well as around the entire length, or circumference in the case of an entirely stadium, elliptical, circular or oval template. Thus, there may be advantageously provided such a taper both near the top portion (e.g., 31) of the template (e.g., 30), near the base portion (e.g., 33) of the template, in between these two extreme locations, and along the entire tapered length of the template.

Referring now to FIGS. 6A-D, there is provided an alternative embodiment template 30", comprised of a stepped, tapered template 30", wherein, similar to tapered template 30, there is provided a top portion 31", a base portion 33", an exterior continuously-tapered surface 32*a"*, and stepped interior surfaces 32*b"* and 32*c*. Further, as with template 30, and 30', template 30" also comprises alignment tapered tenons 44", and a key system 42", except unlike the key systems 42, 42' of templates 30, 30', respectively, template 30" only has a single key system 42", which together with the alignment tapered tenons 44", serves to releasably hold the template 30" on a cross member 24 slot 29.

Figure 6A:
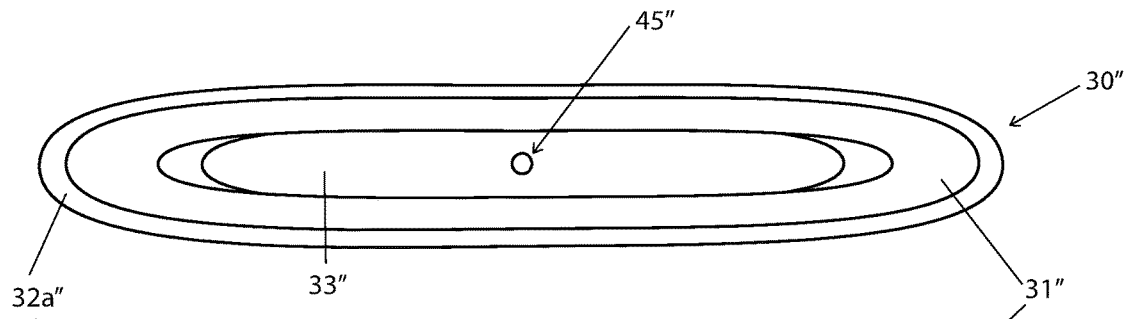
FIG. 6A is a top plan view of a tapered, stepped template of a template guide system in accordance with an alternate embodiment and aspect of the disclosure.
Figure 6B:
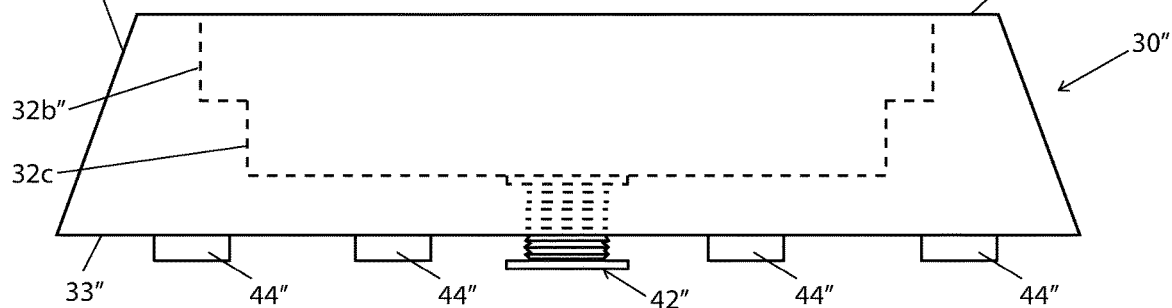
FIG. 6B is a front elevation view of the tapered, stepped template of FIG. 6A.
Figure 6C:
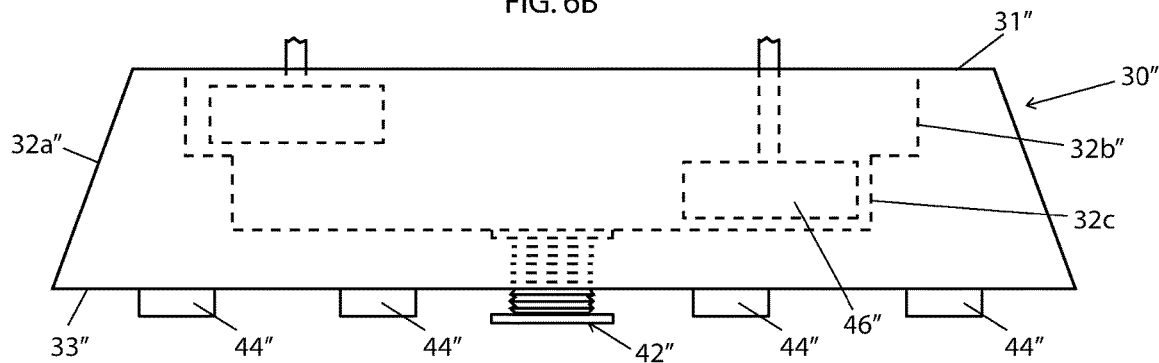
FIG. 6C is an illustrative front elevation view of the tapered, stepped template of FIGS. 6A and 6B, further showing in partial phantom view how a guide bearing would interface with the tapered, stepped template during operation.
Figure 6D:
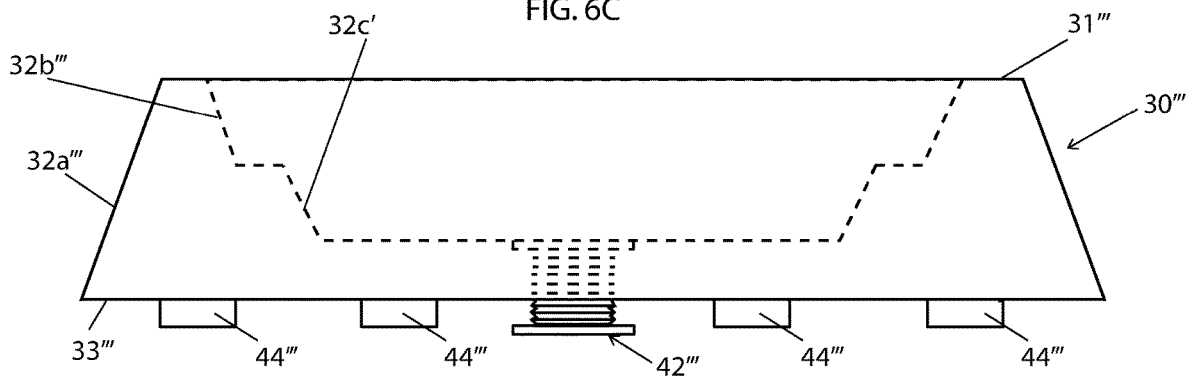
FIG. 6D is a front elevation of yet another alternative embodiment of a tapered, stepped template.

In FIG. 6D, there is provided yet another alternative embodiment template 30''', comprised of a stepped, tapered template 30''', wherein similar to tapered template 30", there is provided a top portion 31''', a base portion 33''', an exterior continuously-tapered surface 32*a'''*, and stepped interior surfaces 32*b'''* and 32*c'*. However, unlike tapered template 30", interior surfaces 32*b'''* and 32*c'* are tapered at each of the steps. Like tapered template 30", tapered template 30''' also comprises alignment tapered tenons 44''', and a key system 42''' for releasably holding the template 30''' on a cross member 24 slot 29.

Figure 8B:
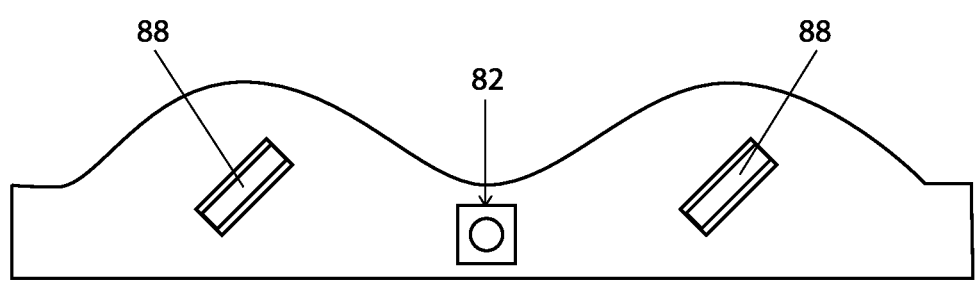
FIG. 8B is a bottom plan view of another base portion of a template adapted for angled orientation on a template holder in accordance with an alternative embodiment and aspect of the disclosure.
Figure 8C:
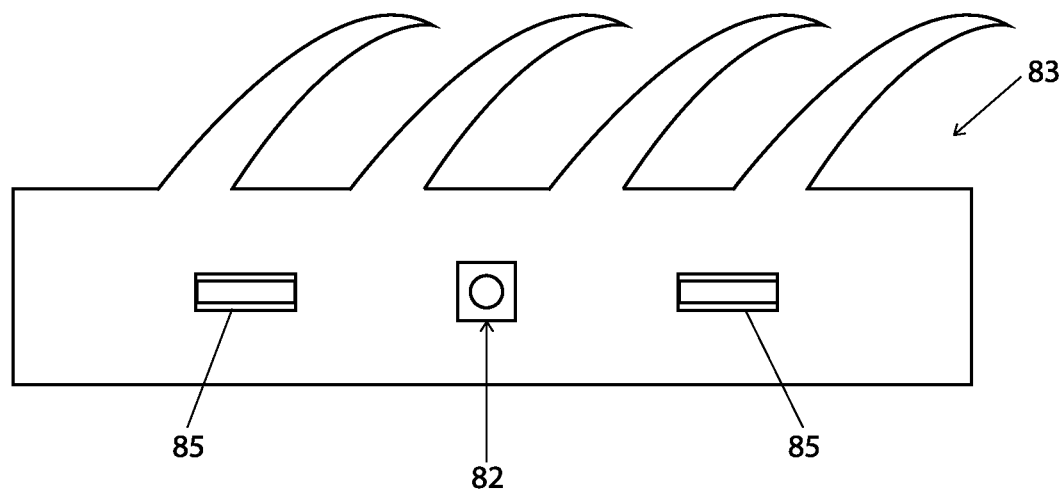
FIG. 8C is a bottom plan view of yet another base portion of a template adapted for horizontal orientation on a template holder in accordance with an alternative embodiment and aspect of the disclosure.

Referring now to FIGS. 8A, 8B, and 8C, there are provided alternative templates 80, 81, 83, respectively. Each such template has a key system 82 similar to that of tapered template 30, for example, and tapered tenons 84, 88, 85, respectively as to FIGS. 8A, 8B, 8C. Because of the orientation of the tapered tenons 84, the segmented template 80 would sit vertically on the cross member 24 similar to segmented template 80 shown in dotted lines on FIG. 2, whereas the template 81 would sit at an angle on the cross member 24, and the template 85 would sit horizontally on the cross member 24.

Figure 2:
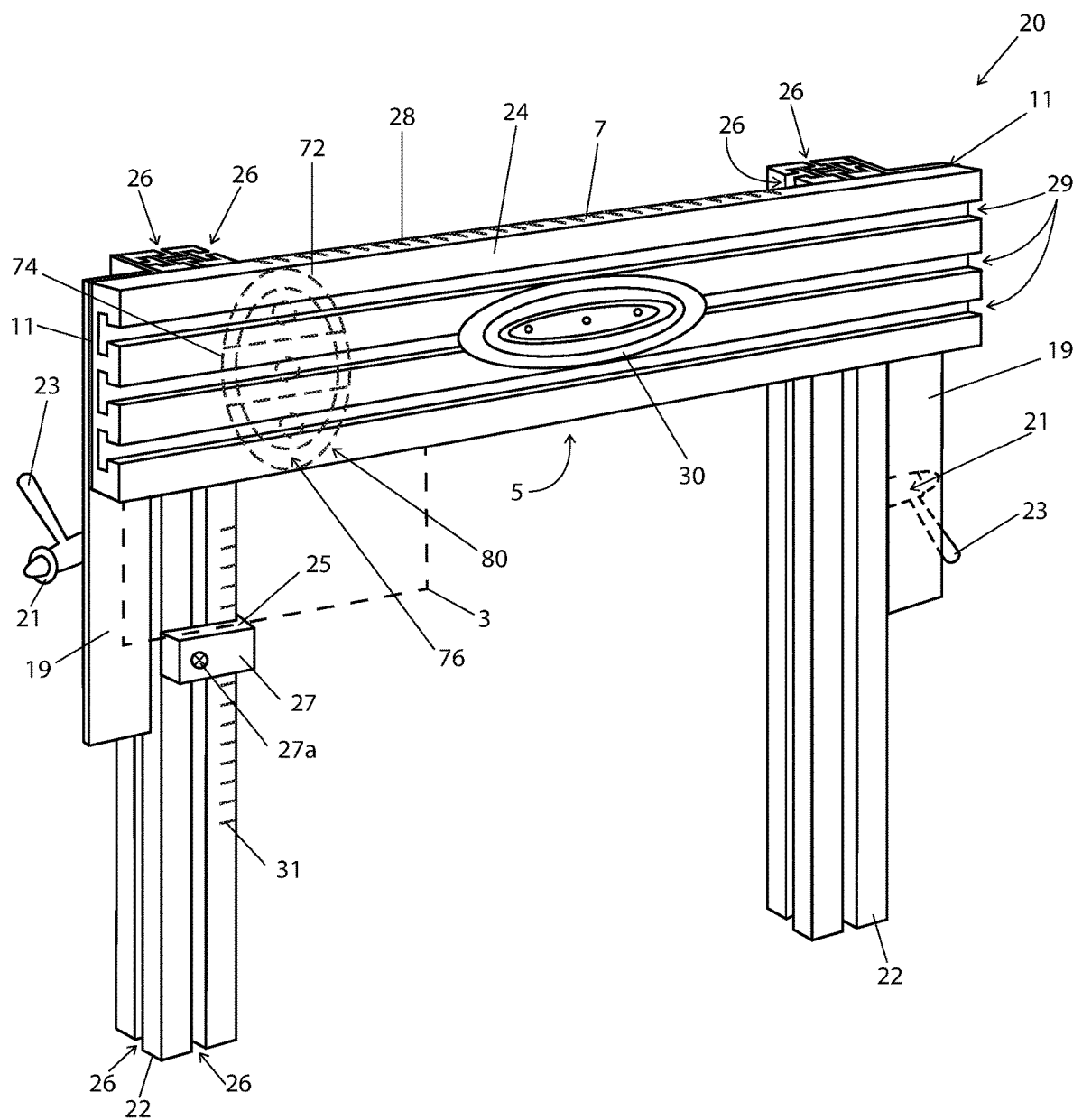
FIG. 2 is a perspective view of an adjustable template holder for a template guide system in accordance with an embodiment and aspect of the disclosure.
Figure 4A:
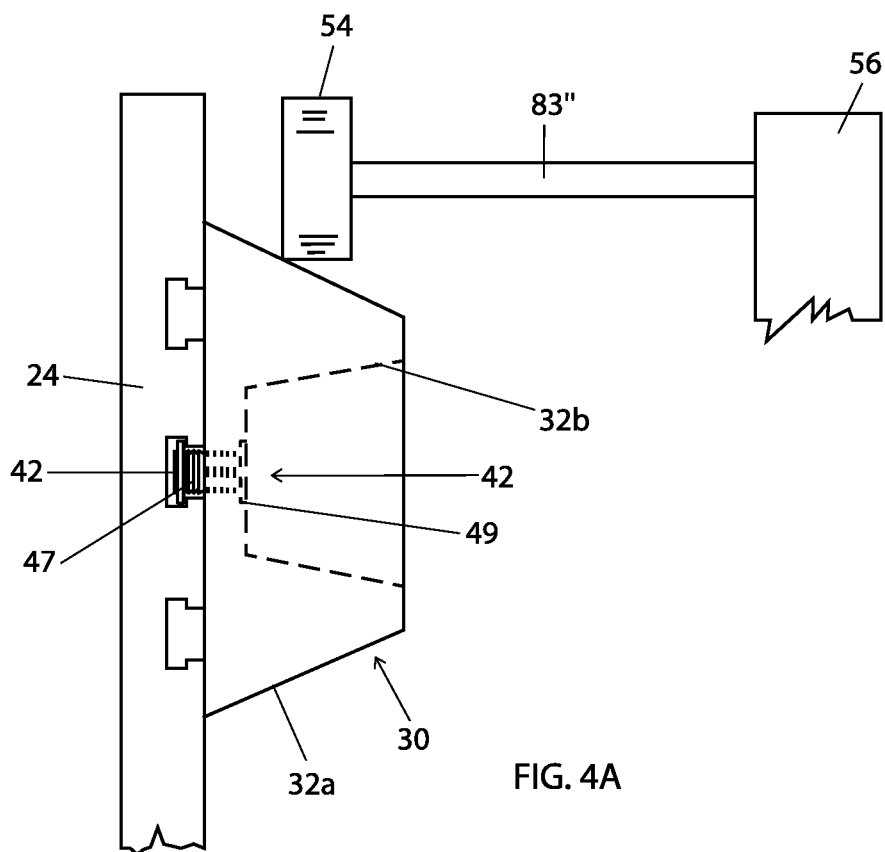
FIG. 4A is a partial side elevation view of a tapered template and guide bearing combination system in accordance with an embodiment and aspect of the disclosure.

Referring now also to FIGS. 4*a* and 5, the invention uses a router motor 50 (as part of a PantoRouter™, or Hybrid PantoRouter™, router system 49), having a router bit 52 and guide bearing, or guide wheel, 54 held on a guide bearing shaft 83" on a pantographic mount 56 on a base or carriage 58. On the pantographic mount 56, the center of the guide bearing 54 is located twice the distance from the reference pivot as the center of the router bit 52. The guide bearing 54 is guided by the operator around or within a template 30, 30', 30", 30''', 80, 81, 83, 90, 92 moveably located in the moveable tapered template holder system 20. Using the handle 51 and arm 53 of the pantographic mount 56, the operator can move the guide bearing 54 up or down the tapers 32*a*, 32*b* of the tapered template 30, or tapers 32*a'*, 32*b'* of the tapered template 31', etc., which creates a larger or smaller cut in the workpiece by the router bit 52. In this way, and by adjusting the depth of the guide bearing 54 on a taper on a template via guide bearing adjustment knob 81, the operator is allowed in micro-adjusting the size of the cut or carve on a workpiece.

Figure 9A:
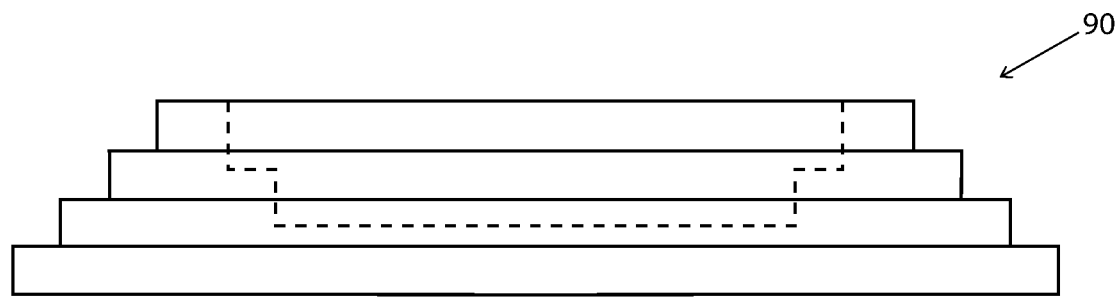
FIG. 9a is a front elevation partial view of part of an alternative embodiment of a template comprising an exterior stepped portion and an interior stepped portion (and without showing tapered tenons and keys for interconnecting to a template holder as per an aspect of the disclosure)
Figure 9B:
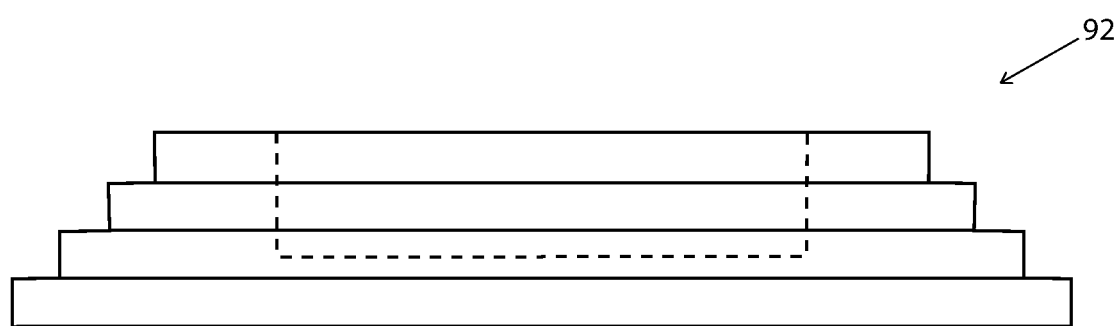
FIG. 9b is a front elevation partial view of part of another alternative embodiment of a template comprising an exterior stepped portion and an interior non-tapered portion (and without showing tapered tenons and keys for interconnecting to a template holder as per an aspect of the disclosure)

Of course, it will be appreciated by those skilled in the art that templates such as those shown in FIGS. 9*a* and 9*b* may be adapted for use with all other aspects of the disclosure, since these templates may be adapted in accordance with this disclosure to include tapered tenons and keys for interconnecting to a template holder as per an embodiment and aspect of the disclosure. Thus, the template 90 shows an alternative embodiment of a template comprising an exterior stepped portion and an interior stepped portion (without showing, for purposes of avoiding redundancy, tapered tenons and keys for interconnecting to a template holder as per an embodiment and aspect of the disclosure). Moreover, the template 92 shows a template comprising an exterior stepped portion and an interior non-tapered portion (again without showing, for purposes of avoiding redundancy, tapered tenons and keys for interconnecting to a template holder as per an embodiment and aspect of the disclosure).

Figure 4B:
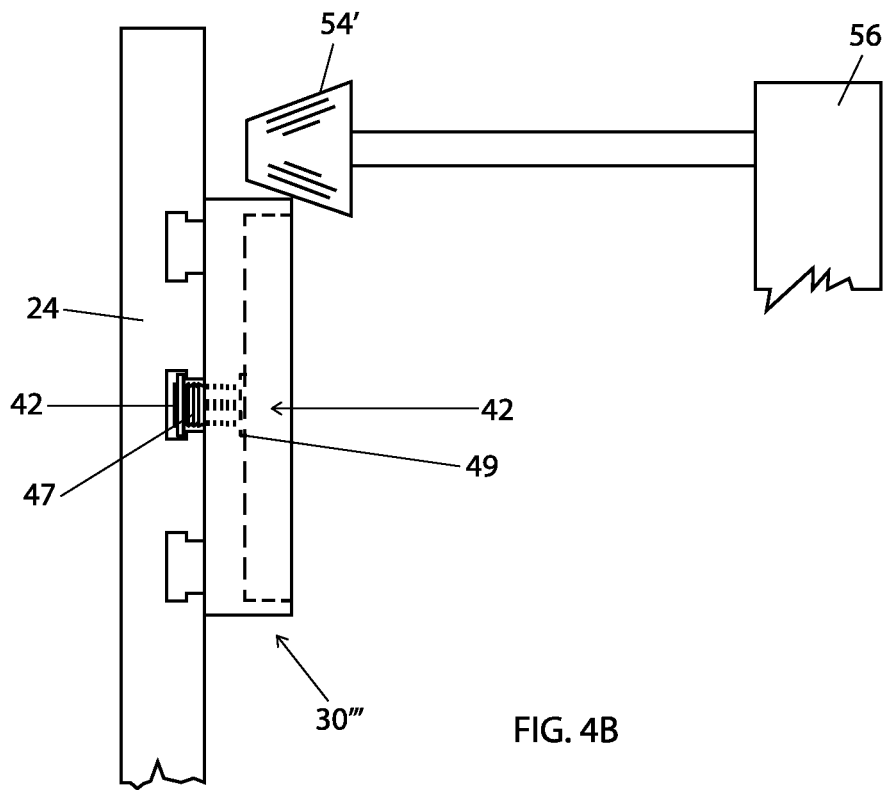
FIG. 4B is a partial side elevation view of a template and tapered guide bearing system in accordance with an alternate embodiment and aspect of the disclosure.

In accordance with an alternative embodiment of the disclosure as shown additionally in FIG. 4B, guide bearings can also be tapered as shown at 54' to be used with stepped templates (e.g., 30" of FIG. 6B, or 90 of FIG. 9A), non-tapered templates 30'''', tapered templates (e.g., 30 of FIGS. 3A-E), or segmented templates (e.g., 30' of FIGS. 7A-B and 80 of FIGS. 8A and 2), to also allow micro-adjusting the size of the cut or carve on a workpiece.

The disclosure, or certain aspects thereof, can be used in any position, including but not limited to horizontal, such as with a Hybrid PantoRouter™ and PantoRouter™, or vertical such as a pin router or similar application. The disclosure, or certain aspects thereof, can also be used with non-pantographic router mount devices. Thus, the template holder system in accordance with an aspect of the disclosure can be moved to different positions, different jigs, or with different machines.

The tapered-template system in accordance with an aspect of the disclosure addresses problems of safety, inaccurate joinery using a router and fixed-size guides or templates. Thus, the disclosure enables quick, accurate, safer and easy-to-make joinery cuts, whether dovetail, mortise and tenon, or box joint cuts.

Further, the tapered-template system in accordance with an aspect of the disclosure allows for easy and quick micro-adjustments to cuts and carves, and thus certain aspects of the disclosure enable quick, accurate and easy-to-make micro-adjustments to a proposed cut. With the use of the template system (whether with non-tapered, tapered, or stepped templates) in accordance with one or more aspects of the disclosure, operators are enabled in greater control over routers using a pantographic router mount in order to make routers safer, easier to use and more accurate. The tapered template system in accordance with an aspect of the disclosure enables installing and changing templates and template holders, thus facilitating the work of setting up, creating, and taking down, a project.

Figure 11:
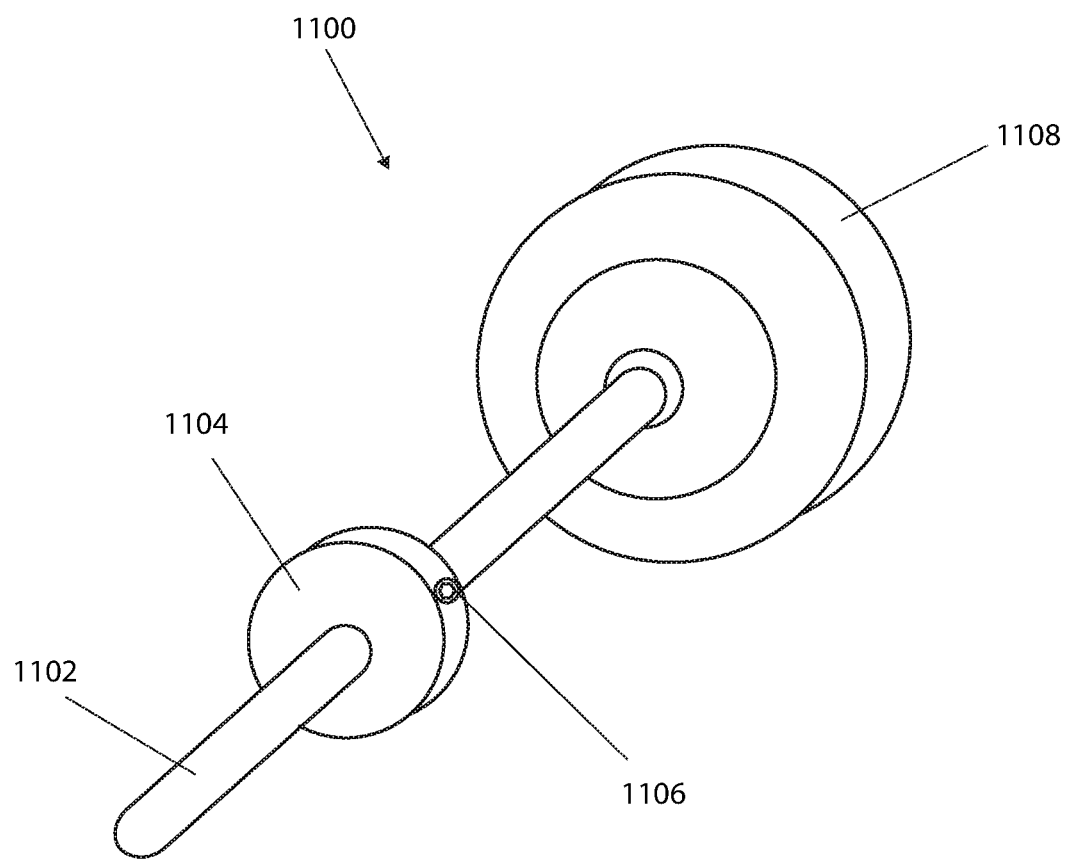
FIG. 11 is a perspective view of a guide bearing assembly comprising a shaft, a locking collar, and a non-tapered guide bearing.

As shown in FIG. 11, there is provided a guide bearing assembly 1100 comprising a shaft 1102, a locking, or lockable, collar 1104, the collar having a tightenable screw 1106 for allow adjustability of the collar on the shaft. The guide bearing assembly further comprises a bearing wheel 1108, which in the embodiment shown is a non-tapered guide bearing wheel adaptable for use as described elsewhere in the disclosure, for example, with a tapered template 30.

The guide bearing assembly 1100 differs from the guide bearing 54 and shaft 83 shown in FIG. 5, in that the guide bearing assembly 1100 comprises the collar 1104 added which enables easy positioning (location), and repositioning (relocation) of the shaft 1102, and hence the guide bearing assembly 1100, relative to arm 53 of the Pantrographic router mount 56.

Figure 12:
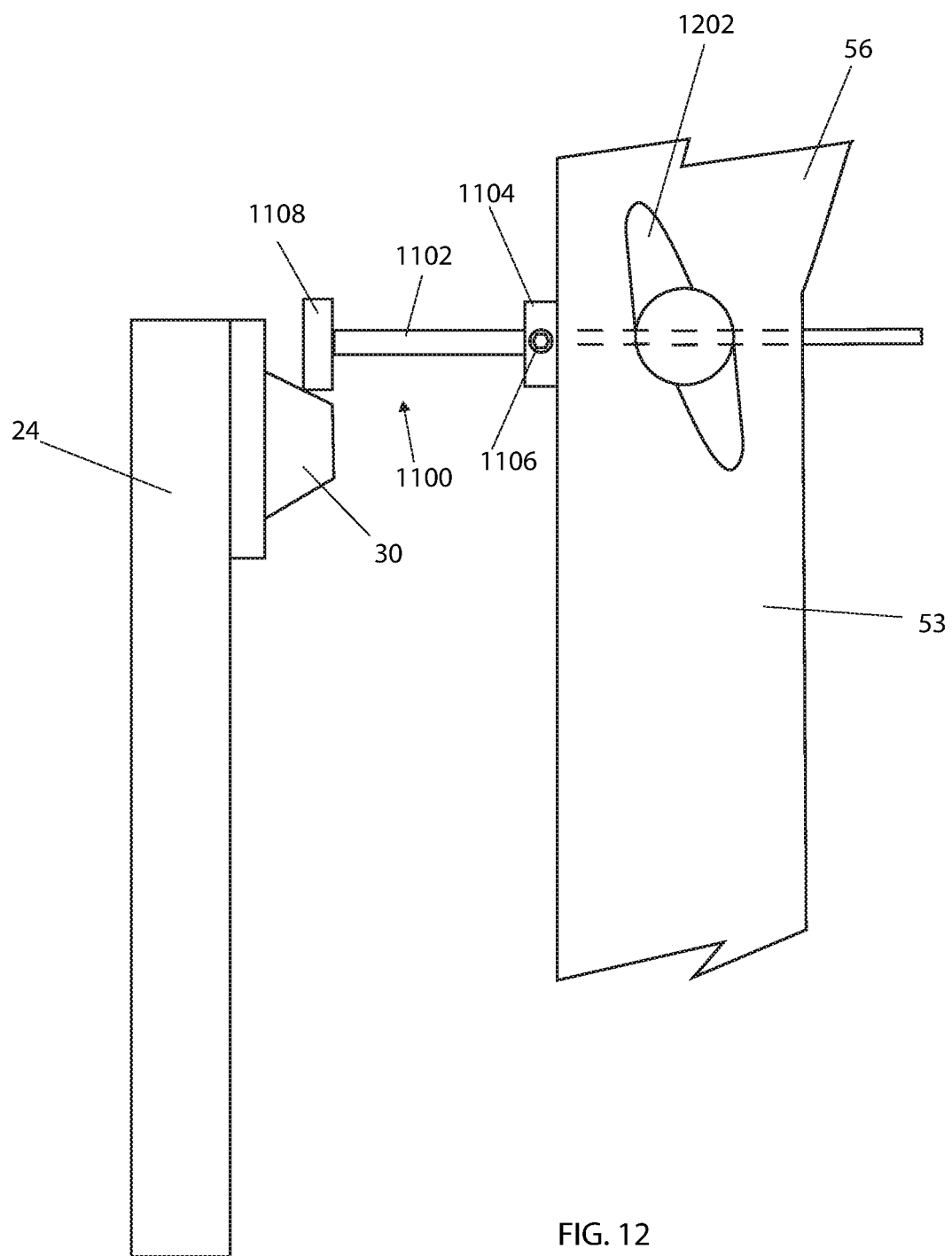
FIG. 12 is a side view of the non-tapered guide bearing assembly with a locking collar shown in FIG. 11 but retained in a router mount frame.

As shown in FIG. 12, there is provided the non-tapered guide bearing assembly 1100 with a locking collar 1104 and on shaft 1102, similar to that shown in FIG. 11, but in FIG. 12 the guide bearing assembly is shown installed on arm 53 of the pantographic router mount 56, wherein the pantographic router mount is part of a pantograph router system with a mechanical advantage, e.g., a 2:1 ratio, in the relative sizes of the template and the cutting path, between the guide bearing 54 and the router bit 52. The shaft 1102 of the guide bearing assembly 1100 is held in place with a knob 1202 retained on a threaded shaft and screwed into the arm 53.

To adjust the depth of the guide bearing assembly 1100, one may unscrew the knob 1202 to loosen its hold on the guide bearing assembly shaft 1102 so that the shaft may be either moved closer to the template 30, or further away from the template. It will be appreciated that in order to move the shaft 1102, and hence the wheel 1108, further away from the template, one would have to loosen the screw 1106 on the locking collar 1104 to allow the collar to slide along the shaft. Then, once the desired depth of the shaft 1102 and wheel 1108 has been achieved relative to the template 30, the collar 1104 may be re-tightened against the arm 53 in such a way that the desired depth may be retained upon removal, and reinstallation, of the guide bearing assembly 1100 into the arm 53.

Figure 13:
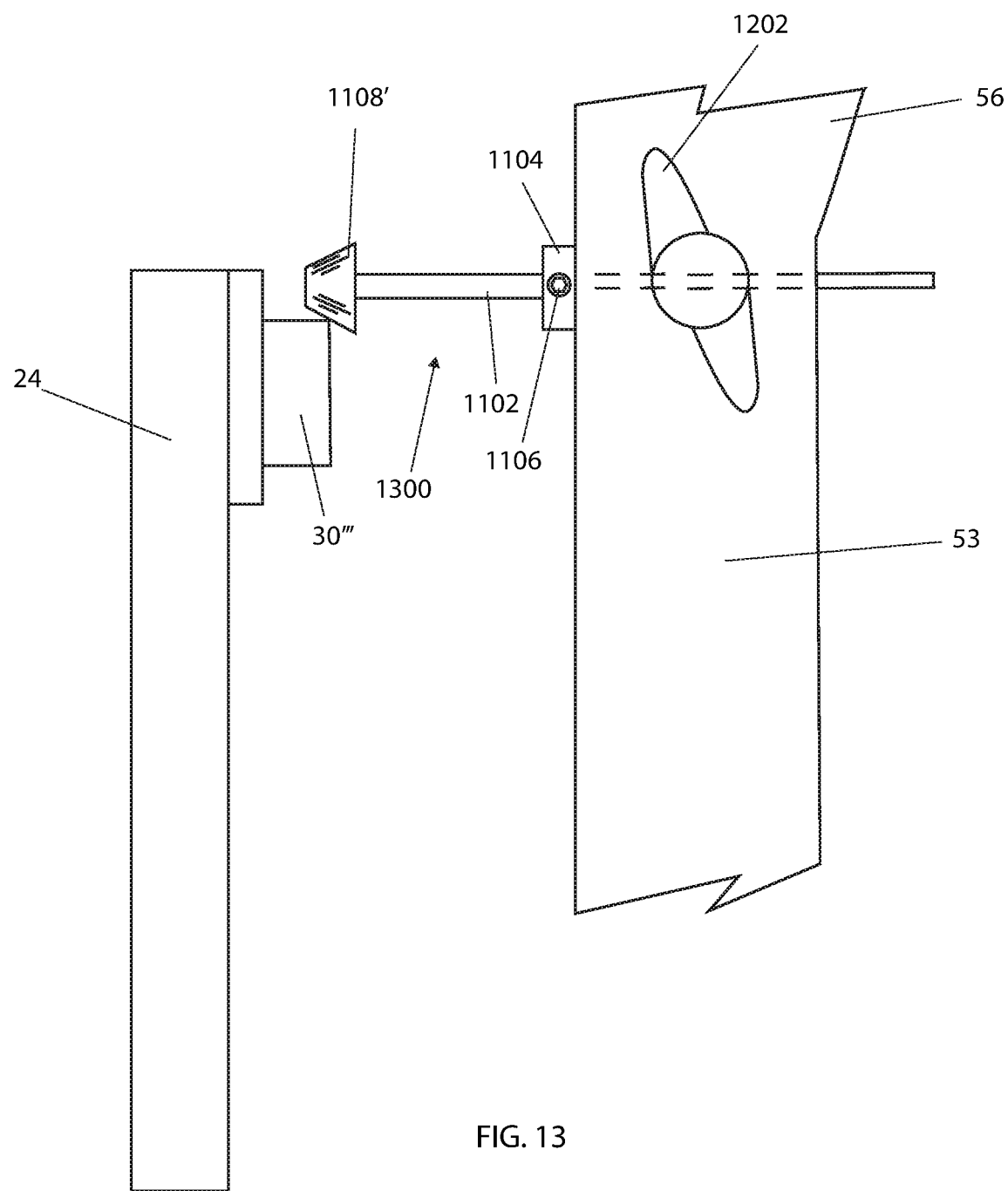
FIG. 13 is a side view of an alternative and tapered guide bearing assembly with a locking collar and retained in an arm, or handle, of a router frame.

As shown in FIG. 13, there is provided an alternative, tapered, guide bearing assembly 1300 with a locking collar 1104 and on a shaft 1102, similar to that shown in FIG. 12, with the guide bearing assembly shown installed on arm 53 of the pantographic router mount 56, the shaft 1102 of the guide bearing assembly 1300 also being held in place with the knob 1202 retained on a threaded shaft and screwed into the arm 53.

The tapered guide bearing assembly 1300 is similar to that shown in FIG. 4B for use, for example, with a non-tapered template 30′″ (but still allowing micro-adjustability of depth of cut according to the desired depth of the guide bearing wheel 1108′, but in FIG. 13 the guide bearing assembly 1300 is shown installed on arm 53 of the pantographic router mount 56, with a locking collar 1104 on shaft 1102 to help locate and hold the guide bearing assembly 1300 at a desired depth relative to the arm 53. Like that shown in FIG. 4B, the guide bearing wheel 1108′ is tapered.

To adjust the depth of the guide bearing assemblies 1100, 1300, one may unscrew the knob 1202 to loosen its hold on the guide bearing assembly shaft 1102 so that the shaft may be either moved closer to the template 30, 30′″, or further away from the template. It will be appreciated that in order to move the shaft 1102, and hence the wheel 1108, 1108′, further away from the template, one would have to loosen the screw 1106 on the locking collar 1104 to allow the collar to slide along the shaft. Then, once the desired depth of the shaft 1102 and wheel 1108, 1108′ has been achieved relative to the template 30, 30′″, the collar 1104 may be re-tightened against the arm 53 in such a way that the desired depth may be retained upon removal, and to facilitate easily repeatable reinstallation, of the guide bearing assembly 1100 into the arm 53.

In this way, with the use of guide bearing assemblies 1100, 1300, repeated manufacture of, for example, consistently-sized mortise and tenon joints, becomes much easier and much less time consuming. This in turn, prevents wasted materials as well otherwise involved where a more trial-and-error type method of determining position for the guide bearing wheel 54 relative to a template 30 or 30′″.

Many modifications and other embodiments of the invention set forth herein will come to mind to one skilled in the art to which this invention pertains and having the benefit of the teaching presented in the foregoing descriptions and the associated drawings. Therefore, it should be understood that the inventions are not to be limited to the specific embodiments disclose and that modifications and other embodiments are intended to be included within the scope of the appended claims.

We claim:

1. A pantograph-type woodworking router guide template and template holder combination, comprising:
a template holder comprising a plurality of post members having at least one keyed slot defined along and extending at least a portion of the length of each said post member and adapted for interconnection with a pantograph carriage, said template holder further comprising at least one cross member adjustably interconnecting said plurality of post members, said template holder cross member further comprising at least one linear keyed slot adapted for removeably retaining at least one template, wherein said template holder further comprises a plurality of clamps for adjustably fixing said cross member relative to said posts; and
a template having a base portion and a top portion, said template further comprising exterior and interior continuous surfaces interconnecting the base and top portions of said template along an outer periphery and an inner periphery of said template, respectively, to facilitate joinery cuts and carves with a single template, the base portion being adapted for removable and adjustable interconnection with the cross member of said template holder.

2. The pantograph-type woodworking router guide template and template holder combination of claim 1, wherein at least a portion of at least one of the exterior continuous surface and the interior continuous surface, is tapered from the base portion to the top portion.

3. A pantograph-type woodworking router guide template and template holder combination, comprising:
a template holder comprising a plurality of post members having at least one keyed slot defined along and extending at least a portion of the length of each said post member and adapted for interconnection with a pantograph carriage, said template holder further comprising at least one cross member adjustably interconnecting said plurality of post members, said template holder cross member further comprising at least one slot adapted for removeably retaining at least one template, wherein said template holder further comprises a plurality of clamps for adjustably fixing said cross member relative to said posts; and
a template having a base portion and a top portion, said template further comprising exterior and interior continuous surfaces interconnecting the base and top portions of said template along an outer periphery and an inner periphery of said template, respectively, to facilitate joinery cuts and carves with a single template, the base portion being adapted for removable and adjustable interconnection with the cross member of said template holder, wherein at least a portion of at least one of the exterior continuous surface and the interior continuous surface is tapered from the base portion to the top portion, and wherein the interior surface further comprises a stepped interior surface having a larger circumference upper interior surface and a smaller circumference lower interior surface.

4. The pantograph-type woodworking router guide template and template holder combination of claim 2, wherein each the exterior continuous surface and the interior continuous surface of said template is tapered between the base portion and the top portion.

5. A pantograph-type woodworking router guide template and template holder combination, comprising:
   a template holder comprising a plurality of post members having at least one keyed slot defined along and extending at least a portion of the length of each said post member and adapted for interconnection with a pantograph carriage, said template holder further comprising at least one cross member adjustably interconnecting said plurality of post members, said template holder cross member further comprising at least one slot adapted for removeably retaining at least one template, wherein said template holder further comprises a plurality of clamps for adjustably fixing said cross member relative to said posts; and
   a template having a base portion and a top portion, said template further comprising exterior and interior continuous surfaces interconnecting the base and top portions of said template along an outer periphery and an inner periphery of said template, respectively, to facilitate joinery cuts and carves with a single template, the base portion being adapted for removable and adjustable interconnection with the cross member of said template holder, wherein both the exterior continuous surface and the interior continuous surface are tapered, wherein the exterior continuous surface is tapered inwardly from the base portion to the top portion, wherein the interior continuous surface is tapered outwardly from the base portion to the top portion, and wherein the taper of each of the continuously-tapered exterior and interior surfaces extends around the entire exterior and interior peripheries, respectively, of said template.

6. The pantograph-type woodworking router guide template and template holder combination of claim 1, wherein the at least one linear keyed slot adapted for removeably retaining at least one template on the cross member interconnecting the support post members comprises a plurality of linear keyed slots, and wherein the base portion of said template is adapted for slideably removable and adjustable interconnection with the linear keyed slots of the cross member of said template holder.

7. The pantograph-type routing woodworking guide template and template holder combination of claim 6, wherein said template holder further comprises a thickness gauge on a 2:1-ratio-type, pantograph-type routing woodworking system, for enabling centering cuts and carvings in a Y-axis of a first workpiece, said thickness gauge further comprising a plurality of clamps on one of said cross member or said support posts and adapted for holding a sample of stock that is the same thickness as the intended workpiece such that the cutting blade of the router is adapted to be positioned so as to create one of a mortise and tenon in the center of the workpiece.

8. The pantograph-type router guide template of claim 1, wherein said template is comprised of a plurality of segments of tapered templates, wherein each segment of tapered template comprises a top portion, a base portion, an exterior continuously-tapered surface interconnecting said base portion and said top portion along an outer periphery and an interior continuously-tapered surface interconnecting said base portion and said top portion along an inner periphery, and wherein each segment of template further comprises two mating end portions such that said plurality of segments of tapered templates may be slideably removably and adjustably attached to the at least one linear keyed slot of said template holder in end-to-end fashion such that the top portion, the base portion, the exterior surface, and the interior surface, of each segment is adapted to be mated at an end of the segment to another segment end forming a continuous top portion, a continuous base portion, a continuous exterior surface and a continuous interior surface, and such that when said plurality of segments are mated end-to-end together they form a complete router guide template with a continuous top portion, a continuous base portion, a continuous exterior surface, and a continuous interior surface.

9. A pantograph-type woodworking router guide template holder adapted for holding a template centered on the template holder by aligning a hole of the template with a hole of the template holder, comprising:
   a plurality of post members having at least one keyed slot defined along and extending at least a portion of the length of each said post member and adapted for interconnection with a pantograph carriage;
   at least one cross member having first and second ends and adjustably interconnecting said plurality of post members, said template holder cross member further comprising at least one linear keyed slot, said template holder cross member defining a hole centered midway between the first and second ends of said template holder cross member and adapted for enabling centering a template by aligning a central hole of the template with the hole centered midway; and
   a plurality of clamps for adjustably fixing said cross member relative to said posts.

10. The pantograph-type woodworking router guide template holder of claim 9, further comprising in combination:
   a template having a base portion and a top portion, said template further comprising exterior and interior continuous surfaces interconnecting the base and top portions of said template along an outer periphery and an inner periphery of said template, respectively, to facilitate joinery cuts and carves with a single template, the base portion adapted for removable and adjustable interconnection with the at least one linear keyed slot of the cross member, said template defining a template centering hole centered within said template and adapted for aligning with the hole centered between the first and second ends of said template holder cross member.

11. The pantograph-type woodworking router guide template holder and template combination of claim 10, wherein at least a portion of at least one of the exterior continuous surface and the interior continuous is tapered from the base portion to the top portion, and wherein said template has a locking key on either side of the template centering hole adapted for removeably locking the template onto the template holder cross member with the template centering hole of the template aligned with the hole centered midway between the first and second ends of the said template holder cross member.

12. The pantograph-type woodworking router guide template holder and template combination of claim 10, wherein the interior surface further comprises a stepped interior surface having a larger circumference upper interior surface and a smaller circumference lower interior surface, and wherein said template has a locking key on either side of the template centering hole adapted for removeably locking the template onto the template holder cross member with the template centering hole of the template aligned with the hole centered midway between the first and second ends of the said template holder cross member.

13. The pantograph-type woodworking router guide template holder and template combination of claim 10, wherein at least one of the exterior continuous surface and the interior continuous surface is tapered between the base portion and the top portion, and wherein said template has a locking key on each side of the template centering hole adapted for removeably locking the template onto the template holder cross member with the template centering hole of the template aligned with the hole centered midway between the first and second ends of the said template holder cross member.

14. The pantograph-type woodworking router guide template holder and template combination of claim 10, wherein both the exterior continuous surface and the interior continuous surface are tapered, wherein the exterior continuous surface is tapered inwardly from the base portion to the top portion, wherein the interior continuous surface is tapered outwardly from the base portion to the top portion, wherein the taper of each of the continuously-tapered exterior and interior surfaces extends around the entire exterior and interior peripheries, respectively, of the template, and wherein said template has a locking key on each side of the template centering hole adapted for removeably locking the template onto the template holder cross member with the template centering hole of the template aligned with the hole centered midway between the first and second ends of the said template holder cross member.

15. An improved method of horizontally centering templates on a template holder cross member comprising the steps:
- inserting a keyed template tenon into a slot of the template holder;
- sliding the template in the slot to near the horizontal center of the template holder;
- pinning with one of a pin and a shaft a center hole of the template to a corresponding center hole in the template holder so as to locate the template at a centered location on the template holder; and
- tightening a locking mechanism of each key associated with the template to fix the template in place at the centered location on the template holder.

* * * * *